(12) United States Patent
Ausich et al.

(10) Patent No.: US 11,893,847 B1
(45) Date of Patent: Feb. 6, 2024

(54) DELIVERING ITEMS TO EVALUATION ROOMS WHILE MAINTAINING CUSTOMER PRIVACY

(71) Applicant: Amazon Technologies, Inc., Seattle, WA (US)

(72) Inventors: Michael Joseph Ausich, Bainbridge Island, WA (US); Zoe Corneli, San Francisco, CA (US); Leon Hsu, Irvine, CA (US); Erin Meyer, Seattle, WA (US); Olga Mironov, Newport Beach, CA (US); Vanessa Nommensen, Seattle, WA (US); Philip Pinette, Seattle, WA (US); Ilene Mina Rafii, Palo Alto, CA (US); Joelle Marie Torneros, Seattle, WA (US); Christian Angelo, Montclair, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/951,617

(22) Filed: Sep. 23, 2022

(51) Int. Cl.
*G06Q 30/06* (2023.01)
*G07C 9/00* (2020.01)
(Continued)

(52) U.S. Cl.
CPC . *G07C 9/00896* (2013.01); *G06Q 10/063112* (2013.01); *G06Q 30/0281* (2013.01);
(Continued)

(58) Field of Classification Search
None
See application file for complete search history.

(56) References Cited

U.S. PATENT DOCUMENTS

| 5,880,731 A | 3/1999 | Liles et al. |
| 7,184,047 B1 | 2/2007 | Crampton |
| (Continued) | | |

FOREIGN PATENT DOCUMENTS

| CN | 110599308 A | 12/2019 |
| JP | 2006338167 A | 12/2006 |

OTHER PUBLICATIONS

Ileperuma, I.C.S, H. M. Y. V. Gunathilake, K. P. A. P. Dilshan, S. A. D. S. Nishali, A. I. Gamage and Y. H.P. P. Priyadarshana, "An Enhanced Virtual Fitting Room using Deep Neural Networks," 2020 2nd International Conference on Advancements in Computing (ICAC), Malabe, Sri Lanka, 2020, pp. 67-72 (Year: 2020).

(Continued)

*Primary Examiner* — K. Wong
(74) *Attorney, Agent, or Firm* — Athorus, PLLC

(57) ABSTRACT

Evaluation rooms (or fitting rooms) at a clothing store include replenishment closets that are accessible to customers and associates of the clothing store, albeit not at the same time. Doors of evaluation rooms include access control systems with interlocks that govern operation of the respective doors. Before an associate opens a first door between an exterior of an evaluation room and a closet to place an item therein, a second door between an interior of the evaluation room and the closet is locked. After the associate places the item in the closet, the first door is closed and locked, and the second door is unlocked, enabling the customer to open the second door and retrieve the item. Feedback indicating that items are being staged in a closet, or that items are staged therein and the closet is accessible to a customer, is provided to the customer within the evaluation room.

20 Claims, 32 Drawing Sheets

(51) Int. Cl.
*G06Q 30/02* (2023.01)
*G06Q 10/0631* (2023.01)
*G06Q 30/0601* (2023.01)

(52) U.S. Cl.
CPC ..... *G06Q 30/0641* (2013.01); *G07C 9/00182* (2013.01); *G07C 2009/00277* (2013.01)

(56) References Cited

U.S. PATENT DOCUMENTS

| | | | |
|---|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,473,747 B2 | 10/2016 | Kobres et al. |
| 9,477,980 B2 | 10/2016 | Zagel et al. |
| 9,827,714 B1 | 11/2017 | Ruxton et al. |
| 9,996,981 B1 | 6/2018 | Tran et al. |
| 10,152,829 B2 | 12/2018 | Jeong et al. |
| 10,204,448 B2 | 2/2019 | Hazeghi et al. |
| 10,210,544 B2 | 2/2019 | Zabaneh |
| 10,282,902 B1 | 5/2019 | Mishra et al. |
| 10,417,825 B2 | 9/2019 | Zagel et al. |
| 10,460,525 B1 | 10/2019 | Buuck et al. |
| 10,878,486 B1 * | 12/2020 | Aflalo ................. H04W 4/33 |
| 2001/0026272 A1 | 10/2001 | Feld et al. |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0097975 A1 | 4/2008 | Guay et al. |
| 2008/0109114 A1 | 5/2008 | Orita et al. |
| 2009/0018926 A1 | 1/2009 | Buehlman |
| 2009/0089186 A1 | 4/2009 | Paolini |
| 2009/0121017 A1 | 5/2009 | Cato et al. |
| 2009/0245573 A1 | 10/2009 | Saptharishi et al. |
| 2010/0026809 A1 | 2/2010 | Curry |
| 2011/0011936 A1 | 1/2011 | Morandi et al. |
| 2011/0022965 A1 | 1/2011 | Lawrence et al. |
| 2011/0298897 A1 | 12/2011 | Sareen et al. |
| 2012/0095589 A1 | 4/2012 | Vapnik |
| 2012/0284132 A1 | 11/2012 | Kim et al. |
| 2012/0299912 A1 | 11/2012 | Kapur et al. |
| 2012/0306876 A1 | 12/2012 | Shotton et al. |
| 2012/0316985 A1 | 12/2012 | Wilkinson et al. |
| 2013/0060610 A1 | 3/2013 | McGurk |
| 2013/0076898 A1 | 3/2013 | Philippe et al. |
| 2013/0173419 A1 | 7/2013 | Farber et al. |
| 2013/0179288 A1 | 7/2013 | Moses et al. |
| 2013/0253700 A1 | 9/2013 | Carson et al. |
| 2014/0063056 A1 | 3/2014 | Zhong |
| 2014/0176565 A1 | 6/2014 | Adeyoola et al. |
| 2014/0180864 A1 | 6/2014 | Orlov et al. |
| 2014/0249961 A1 | 9/2014 | Zagel et al. |
| 2014/0279294 A1 | 9/2014 | Field-Darragh et al. |
| 2014/0282137 A1 | 9/2014 | Lin et al. |
| 2014/0316546 A1 | 10/2014 | Walsh et al. |
| 2015/0019391 A1 | 1/2015 | Kumar et al. |
| 2015/0035820 A1 | 2/2015 | Le et al. |
| 2015/0055085 A1 | 2/2015 | Fonte et al. |
| 2015/0073907 A1 | 3/2015 | Purves et al. |
| 2015/0085184 A1 | 3/2015 | Vidal et al. |
| 2015/0102526 A1 | 4/2015 | Ward et al. |
| 2015/0120496 A1 | 4/2015 | Watson |
| 2015/0123973 A1 | 5/2015 | Larsen |
| 2015/0154691 A1 | 6/2015 | Curry et al. |
| 2015/0248583 A1 | 9/2015 | Sugita et al. |
| 2015/0250420 A1 | 9/2015 | Longinotti-Buitoni et al. |
| 2015/0269282 A1 | 9/2015 | Nelaturi et al. |
| 2015/0324103 A1 | 11/2015 | Tepmongkol et al. |
| 2015/0379623 A1 | 12/2015 | Gadre et al. |
| 2016/0021936 A1 | 1/2016 | Delano |
| 2016/0035061 A1 | 2/2016 | Gadre et al. |
| 2016/0063588 A1 | 3/2016 | Gadre et al. |
| 2016/0155186 A1 | 6/2016 | Su et al. |
| 2016/0180391 A1 | 6/2016 | Zabaneh |
| 2016/0180419 A1 | 6/2016 | Adeyoola et al. |
| 2016/0180449 A1 | 6/2016 | Naware et al. |
| 2016/0196687 A1 | 7/2016 | Alpert et al. |
| 2016/0210602 A1 | 7/2016 | Siddique et al. |
| 2017/0004568 A1 | 1/2017 | Radner |
| 2017/0004657 A1 | 1/2017 | Zagel et al. |
| 2017/0046868 A1 | 2/2017 | Chernov et al. |
| 2017/0124747 A1 | 5/2017 | Knowlton |
| 2017/0173262 A1 | 6/2017 | Veltz |
| 2017/0278272 A1 | 9/2017 | Ravindra |
| 2017/0285345 A1 | 10/2017 | Ferens et al. |
| 2017/0316617 A1 | 11/2017 | Jeong et al. |
| 2018/0130112 A1 | 5/2018 | Gerson |
| 2018/0173945 A1 | 6/2018 | Wang et al. |
| 2018/0308149 A1 | 10/2018 | Guo et al. |
| 2019/0043002 A1 | 2/2019 | King et al. |
| 2019/0272586 A1 | 9/2019 | Huang et al. |
| 2021/0035182 A1 | 2/2021 | Tamir-Tavor |
| 2022/0076172 A1 | 3/2022 | Brown et al. |
| 2022/0271852 A1 | 8/2022 | Hu et al. |

OTHER PUBLICATIONS

Ramesh, N., and T.-S. Moh, "Outfit Recommender System," 2018 IEEE/ACM International Conference on Advances in Social Networks Analysis and Mining (ASONAM), Barcelona, Spain, 2018, pp. 903-910, doi: 10.1109/ASONAM.2018.8508656. (Year: 2018).
Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
Bogo et al., "FAUST: Dataset and Evaluation for 3D Mesh Registration", Proceedings at IEEE Conference on Computer Vision and Pattern Recognition; Jun. 2014.; extracted from Google.com on Sep. 16, 2019.
Cristian Pop, "Introduction to the BodyCom Technology", Microchip AN1391, May 2, 2011, pp. 1-24, vol. AN1391, No. DS01391A, Publisher: 2011 Microchip Technology Inc.
Dayrit, Fabian Lorenzo, et al. "Increasing Pose Comprehension Through Augmented Reality Reenactment"; Published online: Dec. 7, 2015 ; © Springer Science+Business Media New York 2015; extracted from Dialog Solutions on Feb. 4, 2020.
He, Tong and Yang Hu, "FashionNet: Personalized Outfit Recommendation with Deep Neural Network", arXiv:1810.02443v1 [cs.CV] Oct. 4, 2018 (Year: 2018), 9 pages.
Kim, Dong-Eun, "Psychophysical testing of garment size variation using three-dimensional virtual try-on technology," published Mar. 2016 in Textile Research Journal, 86.4: 365-379. Sage Publications Ltd.
Li, J. et al. "Fitting 3D Garment Models onto Individual Human Models"; printed in Computer and Graphics issue Dec. 2010; extracted from Google.com on Sep. 16, 2019.

* cited by examiner

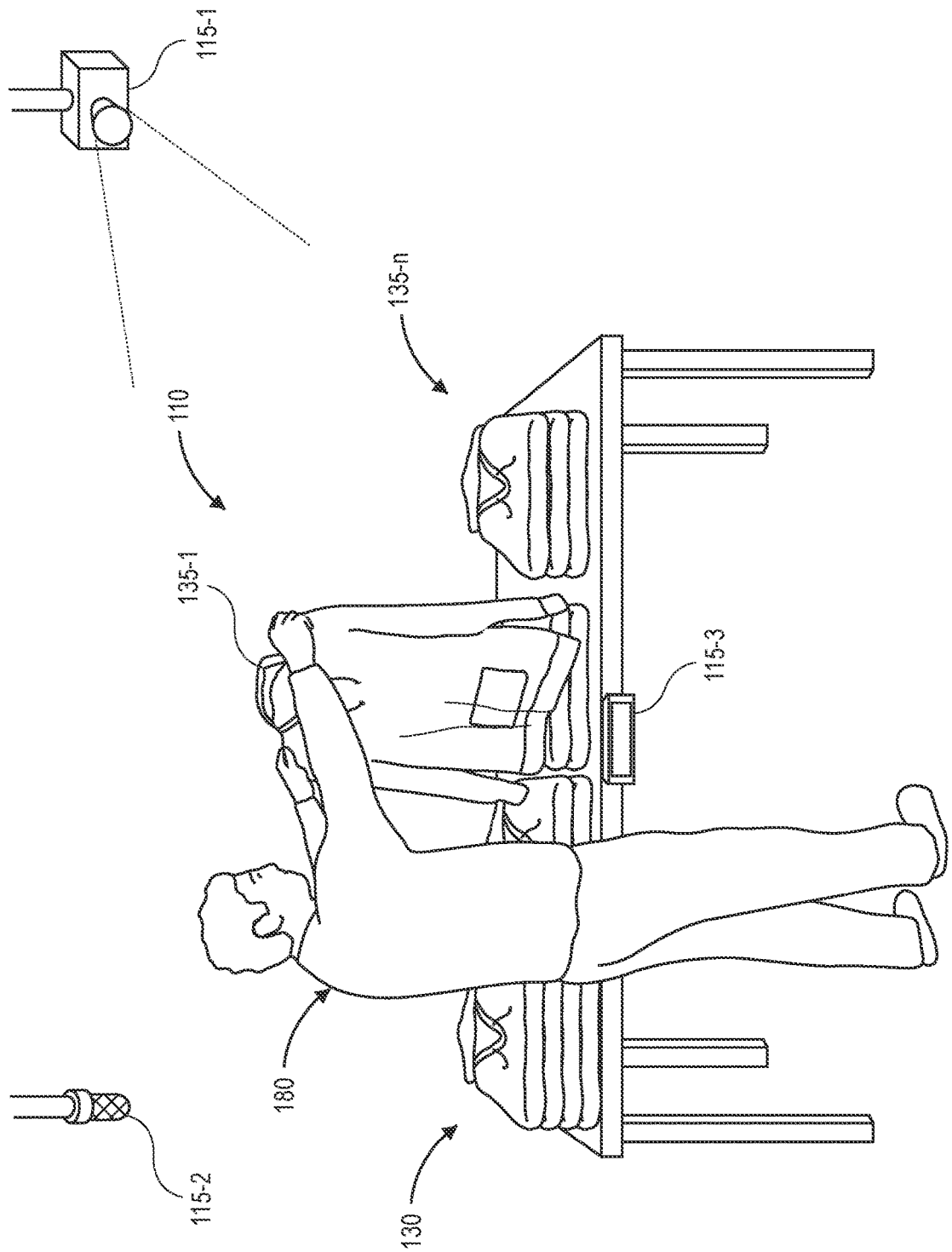

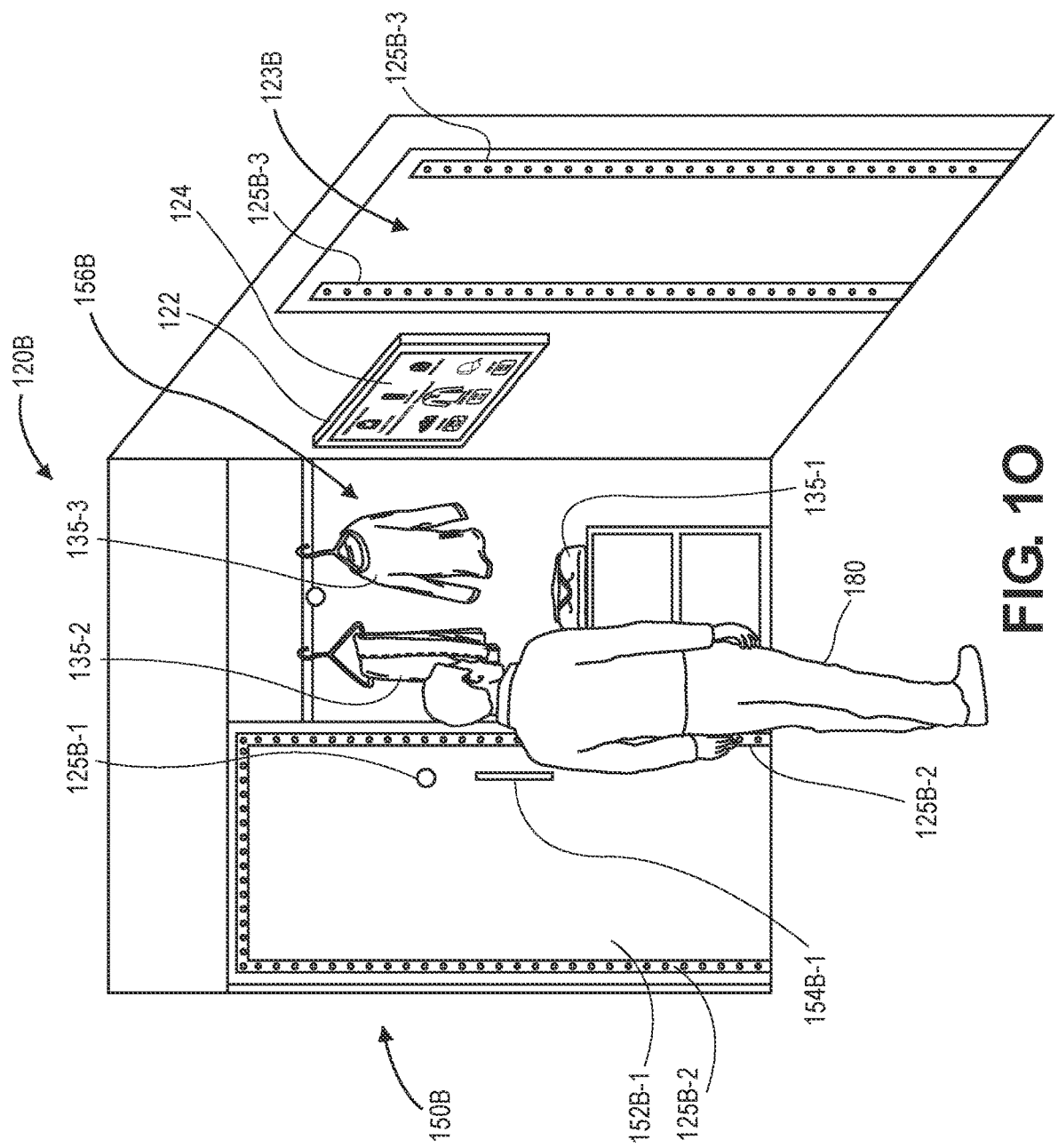

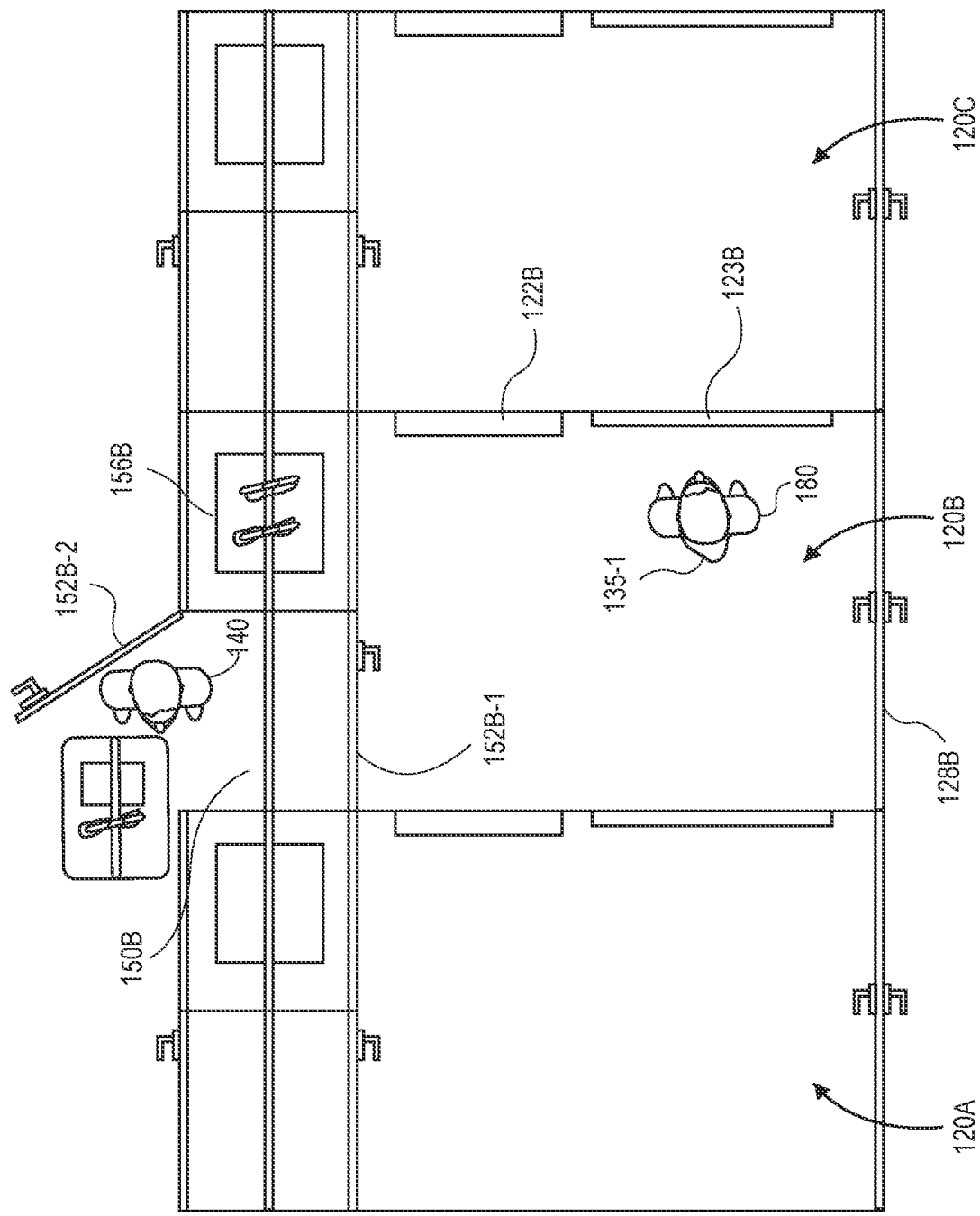

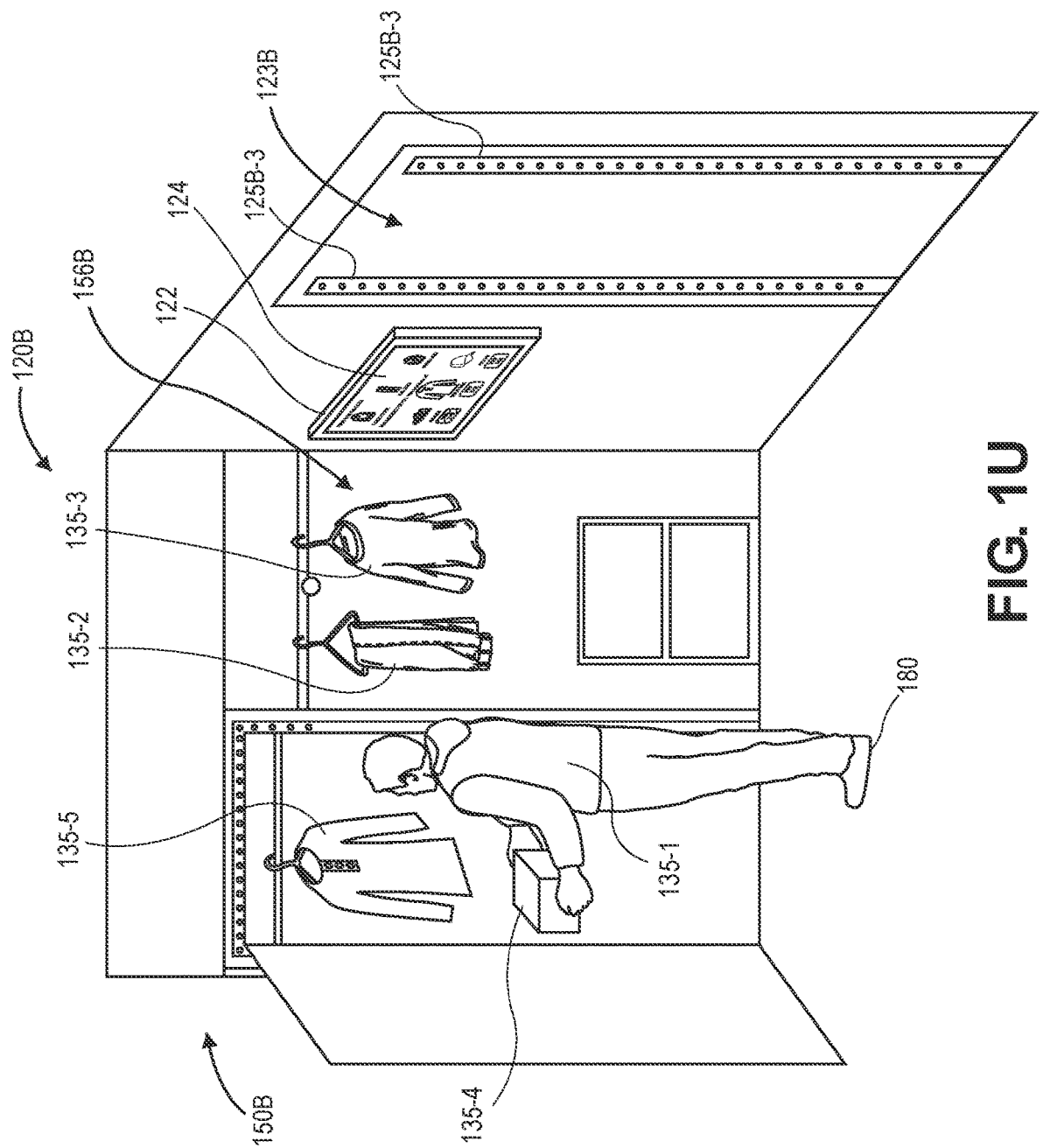

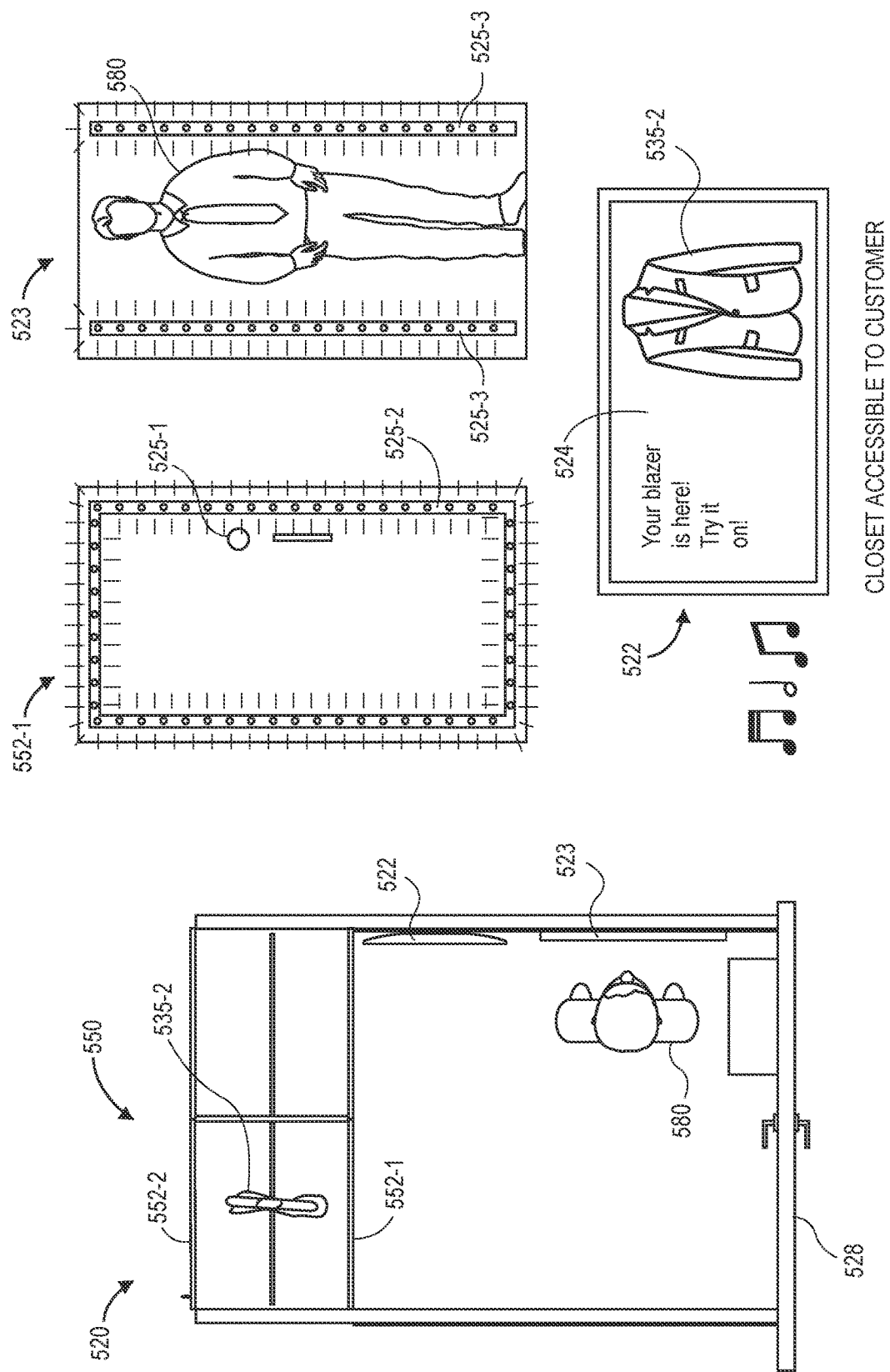

DELIVERING ITEMS TO EVALUATION ROOMS WHILE MAINTAINING CUSTOMER PRIVACY

BACKGROUND

Evaluation rooms (or fitting rooms, changing rooms, dressing rooms or locker rooms) are dedicated spaces of bricks-and-mortar retail establishments that typically include one or more mirrors, chairs, benches or other features that enable a customer to view his or her appearance from different angles or perspectives. Evaluation rooms are commonly made available to customers to evaluate one or more items for suitability prior to making a purchase. For example, a customer who visits a clothing store or another materials handling facility may identify one or more articles of clothing of interest to him or her and take the articles into an evaluation room. Within the evaluation room, the customer may try on one or more of the articles, and remove clothes that he or she is wearing, as necessary, in the privacy of an enclosed or substantially enclosed space. Upon departing an evaluation room, a customer may typically elect to purchase one or more of the items, and any remaining items may be returned to stock, either by the customer or by one or more associates or other personnel at the materials handling facility.

Occasionally, a customer who has entered an evaluation room to evaluate items for suitability may determine that one of the items is unsuitable or suboptimal for his or her purposes, and desire to evaluate one or more other items within the evaluation room. Sometimes, the customer may desire an item that is similar to one or more of items that the customer previously selected, but in a different type, style, model or color. Alternatively, the customer may desire an item that is unlike or unrelated to any of the items that the customer previously selected. In either instance, obtaining additional items desired by a customer in an evaluation room, while the customer is within the evaluation room, may be logistically complex. Because customers commonly evaluate items within evaluation rooms in various stages of undress, a customer who is shopping alone and desires another item in an evaluation room must cover himself or herself in a sufficient number or type of clothes, hide or secure personal items such as a wallet or mobile device within the evaluation room, and prop open or otherwise prevent a door to the evaluation room from closing before proceeding to a shopping area to search for and locate the other item, and returning to the evaluation room to try on the other item. Although a customer who is shopping with a friend, a spouse, a partner or another companion may ask the companion to search for, locate, and return with the other item, the companion is unable to shop for himself or herself while he or she is doing work on behalf of the customer. Likewise, when a customer requests that an associate or another worker at the store aid obtain another item for him or her and deliver the item to him or her within an evaluation room, the customer must also wait for the associate or the other worker to arrive with the other item and often must cover himself or herself in order to receive it.

Unless properly and effectively performed, processes for delivering items to customers within evaluation rooms while maintaining their personal privacy may diminish the shopping experiences of such customers, and unnecessarily reduce a likelihood that such customers will purchase one or more of the items, or others.

BRIEF DESCRIPTION OF THE DRAWINGS

FIGS. 5A through 5D are views of aspects of one system for delivering items to evaluation rooms in accordance with implementations of the present disclosure.

DETAILED DESCRIPTION

As is set forth in greater detail below, the present disclosure is directed to delivering items to evaluation rooms (e.g., fitting rooms) at materials handling facilities, such as bricks-and mortar clothing stores, while maintaining privacy of customers within such rooms. More specifically, the systems and methods of the present disclosure are directed to the use of closets, or replenishment closets, to deliver items to evaluation rooms.

In some implementations, a first wave of items (e.g., articles of clothing of any type or form) may be delivered by an associate to an evaluation room by way of a replenishment closet having a pair of doors, including a first door between an inventory area or other space and an enclosure of the replenishment closet, and a second door between the enclosure of the replenishment closet and an enclosure of the evaluation room. Where the first wave of items is requested by or on behalf of a customer, the customer may be permitted to enter and evaluate (e.g., try on) one or more of the items within the confines of the evaluation room, and in a private manner. Additionally, while the customer is within the evaluation room, the customer may request that a second wave including one or more additional items be delivered to the evaluation room, such as by one or more interactions with a computer system. With the second door locked, the second wave of items may be retrieved from the inventory area delivered to the replenishment closet by way of the first door. Once the items have been staged within the replenishment closet, the first door may be locked, and the second door may be unlocked, enabling the customer to retrieve the items from the replenishment closet from within the evaluation room.

Feedback devices within an evaluation room (e.g., lights, speakers, or interactive displays) may provide signals to a customer within the evaluation room and indicate a status of the evaluation closet, or whether the evaluation closet may be accessed by the customer. The feedback devices may be mounted to or embedded in association with any fixtures or features of the evaluation rooms, and configured to generate feedback that may be viewed or otherwise sensed by a customer in any location within the evaluation room.

The systems and methods of the present disclosure may therefore enhance the privacy of customers who are undressing or otherwise in compromised conditions within evaluation rooms of clothing stores or other materials handling facilities, and extend their shopping experiences by enabling such customers to continue to request and receive additional items while they are already within such evaluation rooms, and without requiring such customers to depart from the evaluation rooms.

Figure 1A:
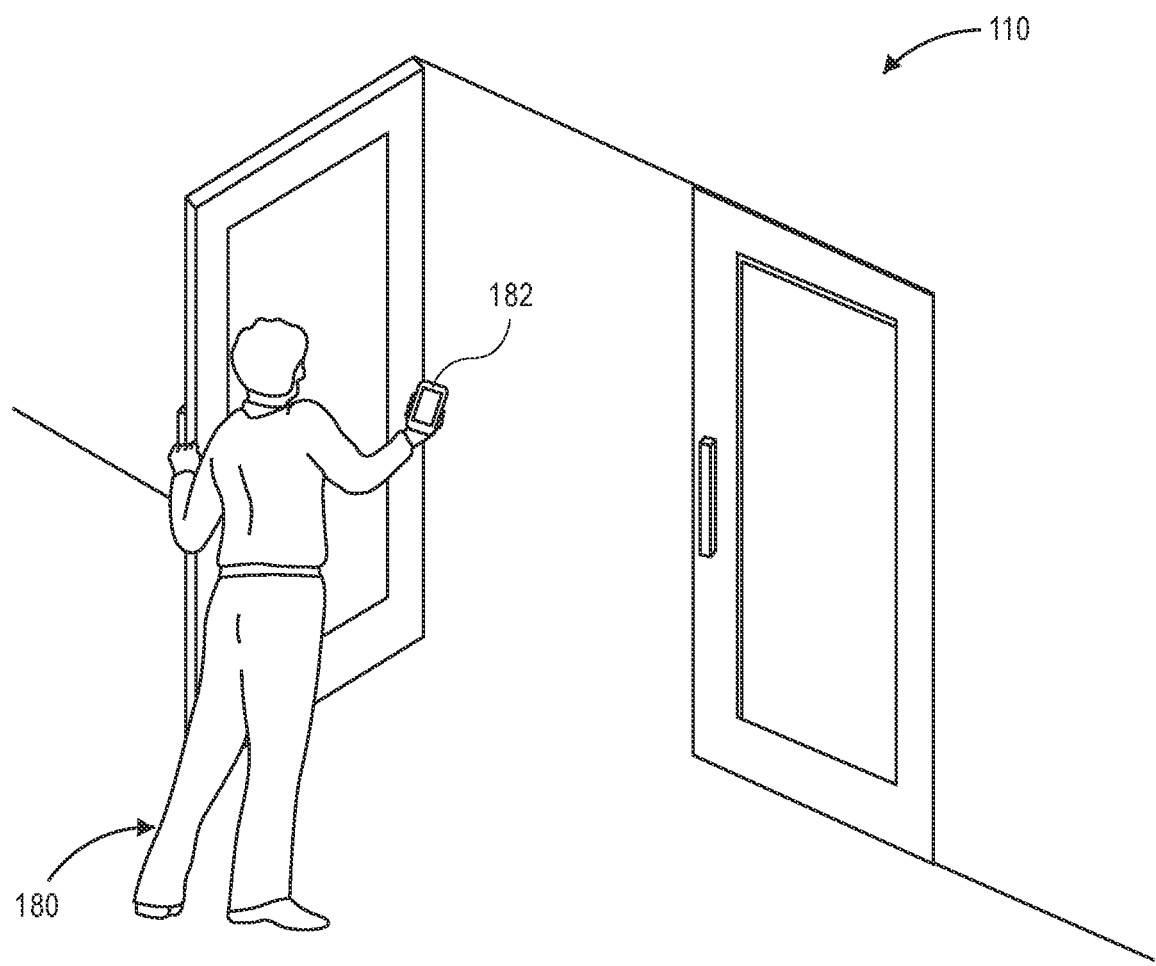
FIGS. 1A through 1U are views of aspects of one system for delivering items to evaluation rooms in accordance with implementations of the present disclosure.

Referring to FIGS. 1A through 1U, views of aspects of one system for delivering items to evaluation rooms in accordance with implementations of the present disclosure are shown. As is shown in FIG. 1A, a customer 180 bearing a mobile device 182 or other computer-based system enters a clothing store 110 or another materials handling facility at which articles of clothing are available for purchase, rent, or borrowing by customers (e.g., the customer 180).

Figure 1B:
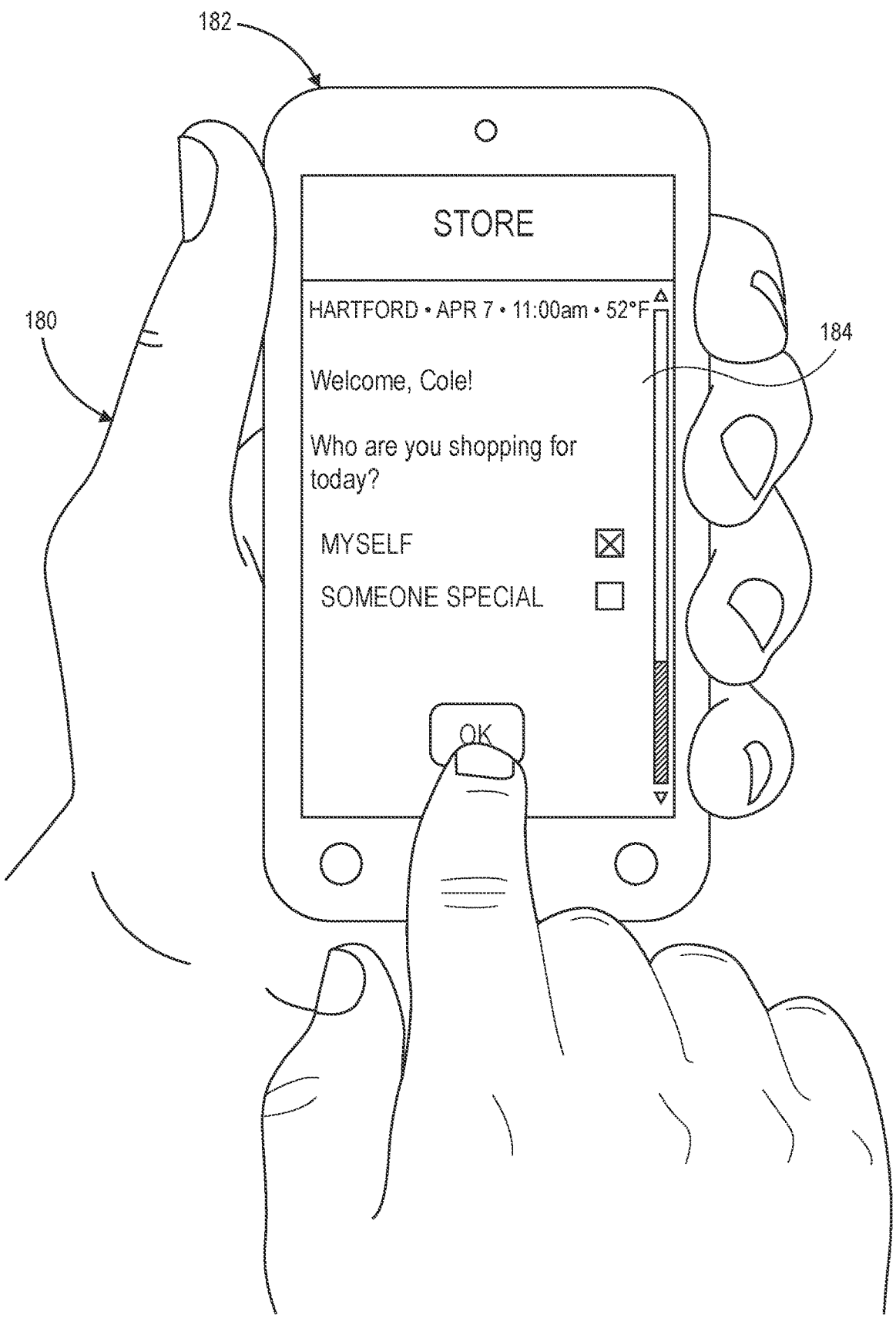
Figure 1C:
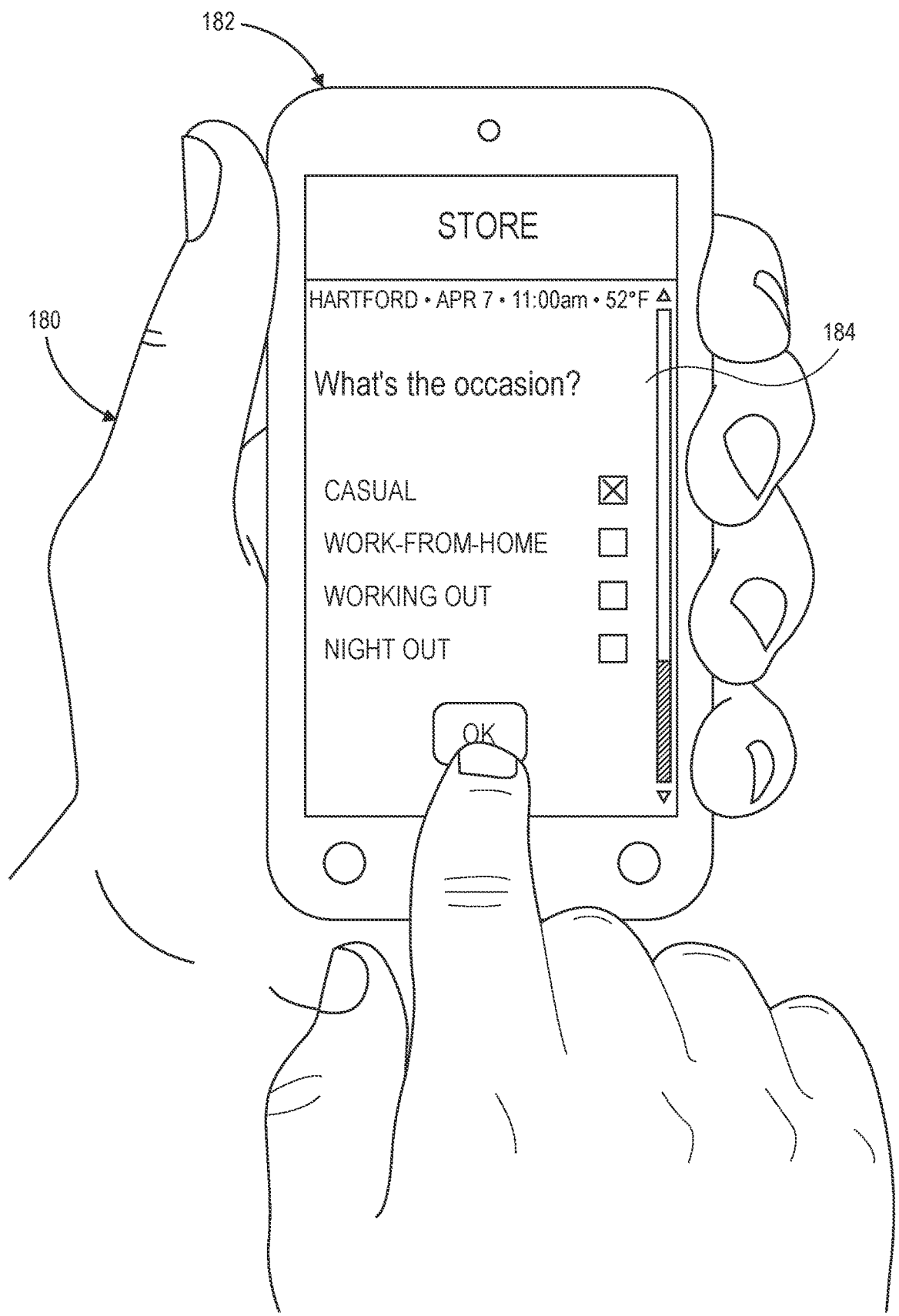
Figure 1D:
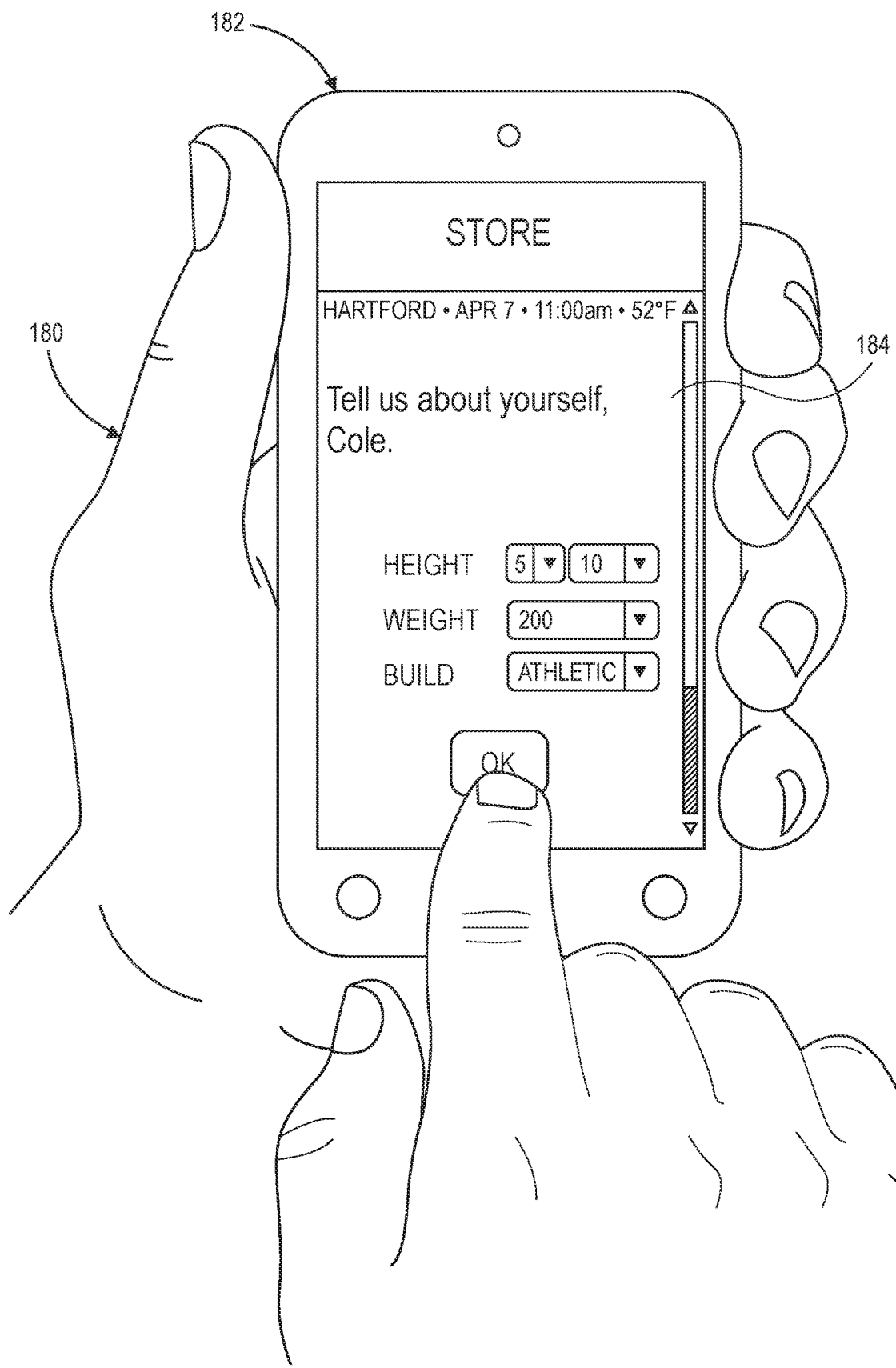

As is shown in FIGS. 1B through 1D, upon entering the clothing store 110, the customer 180 (viz., "Cole") provides information regarding his or her intent in patronizing the clothing store 110, or information regarding one or more items in which he or she is interested, via the mobile device 182. In some implementations, the customer 180 may complete a survey or otherwise answer one or more questions by executing one or more interactions with a user interface provided on a touchscreen display 184 of the mobile device 182. For example, as is shown in FIG. 1B, the customer 180 indicates that he has visited the clothing store 110 to shop for himself, and as is shown in FIG. 1C, the customer 180 indicates that he is interested in shopping for casual clothing, as opposed to work attire (e.g., clothing for working from home), exercise attire, or evening wear. The customer 180 makes his or her selections by executing one or more interactions with features rendered on the touchscreen 184, such as checkboxes or radio buttons.

As is shown in FIG. 1D, the customer 180 provides information regarding his or her personal sizes or dimensions. For example, as is shown in FIG. 1D, the customer 180 operates one or more drop-down menus to indicate his or her height and weight, e.g., in feet and inches or in pounds, and to select one or more terms describing his or her build, viz., "Athletic," as opposed to "Slim," "Lean," or others. Alternatively, the customer 180 may complete surveys, answer questions or provide information via any other interactive features, such as text boxes, list boxes, buttons or any other features. Moreover, in some implementations, the customer 180 may complete surveys, answer questions, or provide information in any other manner, such as by voice utterances or gestures, which may be captured using acoustic or imaging sensors, respectively. Furthermore, in some implementations, the customer 180 may complete surveys, answer questions, or provide information in any other manner, including not only upon arriving at the clothing store 110, such as is shown in FIGS. 1B through 1D, but also prior to arriving, e.g., via a computer device or other system at a home of the customer 180, or after the customer 180 has arrived and has already begun shopping.

As is shown in FIG. 1E, the customer 180 attends an inventory location 130 within the clothing store 110. The inventory location 130 shown in FIG. 1E includes a plurality of sensors, including a camera 115-1, a microphone 115-2 (or another acoustic sensor), and a radiofrequency identification (or "RFID") reader 115-3. The inventory location 130 may be or include a table, a shelf, a platform, or any other surface for accommodating a plurality of items 135-*n* in inventory thereon, that is within an operational range of each of the sensors. For example, the inventory location 130 is within a field of view of the camera 115-1, and within an acoustic range of the microphone 115-2. Moreover, one or more of the items 135-*n* may be outfitted with an RFID tag (or transmitter) and placed on the inventory location 130, such that the RFID reader 115-3 is within a read range of each of the RFID tags. Although the clothing store 110 of FIG. 1E is shown as having only a single camera 115-1, a single microphone 115-2 and a single RFID reader 115-3, the materials handling facilities of the present disclosure may include any number of cameras, microphones, RFID readers or other sensors. In some implementations, materials handling facilities of the present disclosure need not include any cameras, microphones, RFID readers, or any other sensors. Moreover, although the clothing store 110 of FIG. 1E is shown as including only a single inventory location 130, the materials handling facilities of the present disclosure may include any number of inventory locations of any type, form or kind, and such inventory locations may include any number of items of any type, form or kind thereon.

As is also shown in FIG. 1E, the customer 180 selects an item 135-1 (viz., a hooded sweatshirt) from the inventory location 130. The selected item 135-1 is one of the plurality of items 135-*n* at the inventory location 130. Information or data regarding the selection of the item 135-1 by the customer 180 may be determined in any manner. For example, in some implementations, imaging data captured by the camera 115-1 may be processed to determine that the customer 180 has executed one or more gestures involving the selected item 135-1, e.g., grasping, raising, and repositioning the selected item 135-1 for evaluation, or departing the inventory location 130 with the selected item 135-1. Alternatively, or additionally, in some implementations, acoustic signals captured by the microphone 115-2 may indicate expressions of interest in or approval of the selected item 135-1, viz., "this looks great. Love the color!" Alternatively, or additionally, in some implementations, movement or a departure of the selected item 135-1 from the inventory location 130 may be detected by the presence or absence of one or more RFID signals transmitted by an RFID tag associated with the selected item 135-1 when the selected item 135-1 enters within or departs from a read range of the RFID reader 115-3. Alternatively, the selection of the item 135-1 by the customer 180 may be detected in any other manner, such as by a human stylist, an associate or other personnel at the clothing store 110.

Figure 1F:
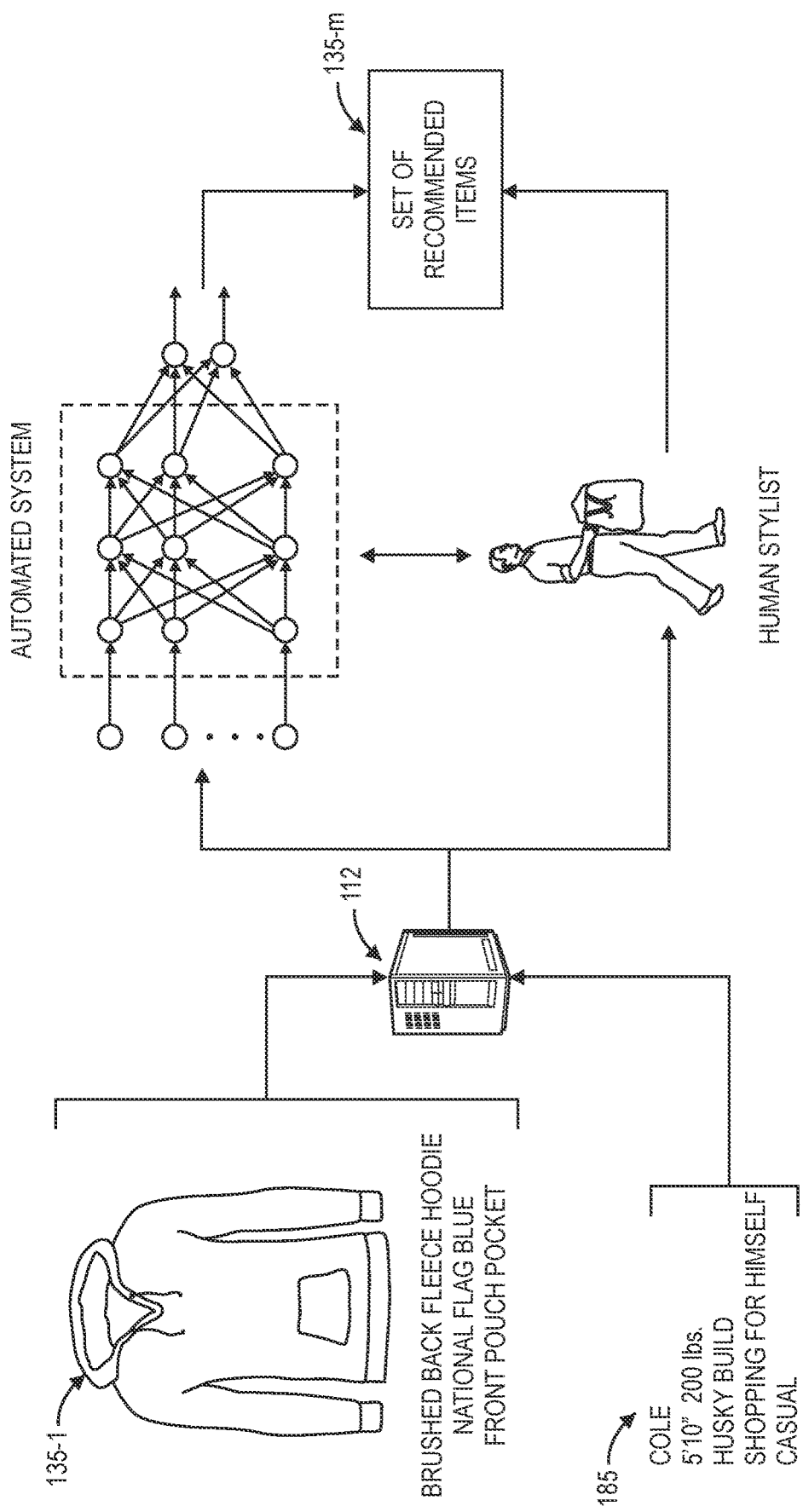

In accordance with some implementations of the present disclosure, a group of other items, such as complements, substitutes or replacements, may be identified for the selected item 135-1 on any basis. As is shown in FIG. 1F, a server 112 or other computer device or system associated with the clothing store 110 may retrieve or otherwise access information or data regarding the selected item 135-1, the customer 180, or any other relevant information or data, and identify a group of recommended items 135-*m* from the items 135-*n* in inventory at the clothing store 110 for the selected item 135-1 based on the information or data. For example, the server 112 may execute one or more recommendation engines or other applications or programs to select the one or more of the items 135-*n* from inventory according to a matrix factorization technique or in any other manner. The server 112 may also provide the information or data to a human stylist, who may select one or more of the recommended items 135-*m* from the items 135-*n* in inventory.

For example, as is shown in FIG. 1F, the server 112 may retrieve or access information or data regarding the selected item 135-1, such as a color, a size or a texture of the selected item 135-1, one or more fabrics from which the selected item 135-1 was formed, any additional features of the selected item 135-1, or one or more functions or applications during which the selected item 135-1 is intended to be used. The server 112 may also retrieve or access information (or data) 185 regarding the customer 180 from any number of sources or in any manner. The information 185 may include information or data directly provided by the customer 180, e.g., via the mobile device 182 or in any other manner, such as answers or responses furnished by the customer 180, as shown in FIGS. 1B through 1D. In some implementations, the information 185 may also include information maintained in a profile of the customer 180 by the clothing store 110, an electronic marketplace, or any other entities or systems. The information 185 may also include a browsing history of the customer 180, a purchasing history of the customer 180, or any other information or data regarding the customer 180.

The recommendation engines or other applications executed by the server 112 may identify the group of recommended items 135-*m* from the inventory of items 135-*n* available at the clothing store 110 on any basis. In some implementations, the server 112 may identify one or more items that may be worn by the customer 180 in connection with the selected item 135-1, and of various types or classifications. For example, where the selected item 135-1 is a hooded sweatshirt, the recommendation engines or other applications executed by the server 112 may identify one or more pairs of pants (e.g., jeans, khaki pants, corduroy pants) that the customer 180 may wear while wearing the selected item 135-1, one or more shirts (e.g., T-shirts or Henley shirts) that may be worn beneath the selected item 135-1, or a hat (e.g., a winter hat) that may be worn by the customer 180 along with the selected item 135-1. The recommended items 135-*m* of the group may have any colors, textures or other features, and in sizes that are consistent with sizes ordinarily associated with the customer 180. The recommended items 135-*m* may be selected on any basis. Alternatively, the recommendation engines or other applications executed by the server 112 may identify a group of items for the customer 180 even if the customer 180 has not selected any items. For example, where information or data regarding the customer 180 is available, e.g., in a profile of the customer 180, or is provided by the customer 180, such as is shown in FIGS. 1B through 1D, the recommendation engines or other applications may identify a group of items for the customer 180 based at least in part on this information or data.

The human stylist may also rely on his or her knowledge, skills and experience, and select one or more of the recommended items 135-*m* from inventory at the clothing store 110.

Figure 1G:
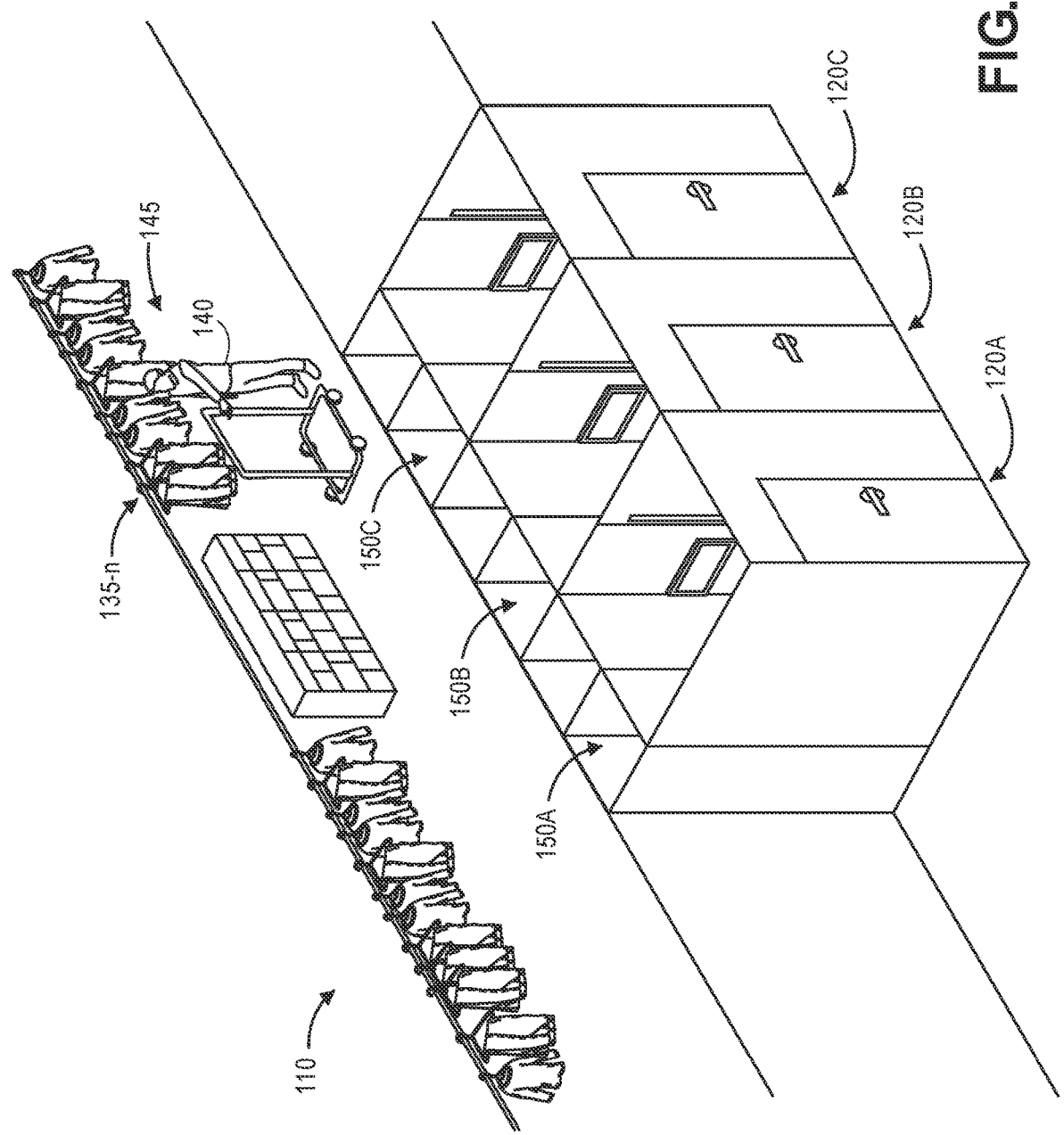

In accordance with implementations of the present disclosure, materials handling facilities, such as the clothing store 110, may feature a plurality of evaluation rooms, each including replenishment closets by which one or more items may be delivered to customers within the evaluation rooms in a manner that maintains privacy of the customers while extending the commercial experiences of the customers into the evaluation rooms. As is shown in FIG. 1G, a portion of the clothing store 110 includes an inventory area 145 and a plurality of evaluation rooms 120A, 120B, 120C, each of which includes a replenishment closet 150A, 150B, 150C.

The inventory area 145 includes a plurality of sets of shelves, racks or other systems or locations for storing items, as well as any number of carts or other mobile systems for transporting items within the inventory area 145, or between the inventory area 145 and one of the evaluation rooms 120A, 120B, 120C. Items may be stocked, managed or dispensed in terms of countable, individual units or multiples of units, such as packages, cartons, crates, pallets or other suitable aggregations, on one or more of the shelves, racks or other systems or locations. One or more associates or machines may retrieve items from the shelves, racks or other systems or locations and transport the items within the inventory area 145, or to one of the evaluation rooms 120A, 120B, 120C.

Each of the plurality of evaluation rooms 120A, 120B, 120C includes an enclosure defined by a plurality of walls or other barriers, as well as a door or another portal by which the respective enclosures of the evaluation rooms 120A, 120B, 120C may be accessed by customers from the shopping area 130. Each of the replenishment closets 150A, 150B, 150C also includes an enclosure defined by a plurality of walls or other barriers, as well as doors or other portals by which the replenishment closets 150A, 150B, 150C may be accessed by associates from the inventory area 145, or customers in each of the plurality of evaluation rooms 120A, 120B, 120C.

Figure 1H:
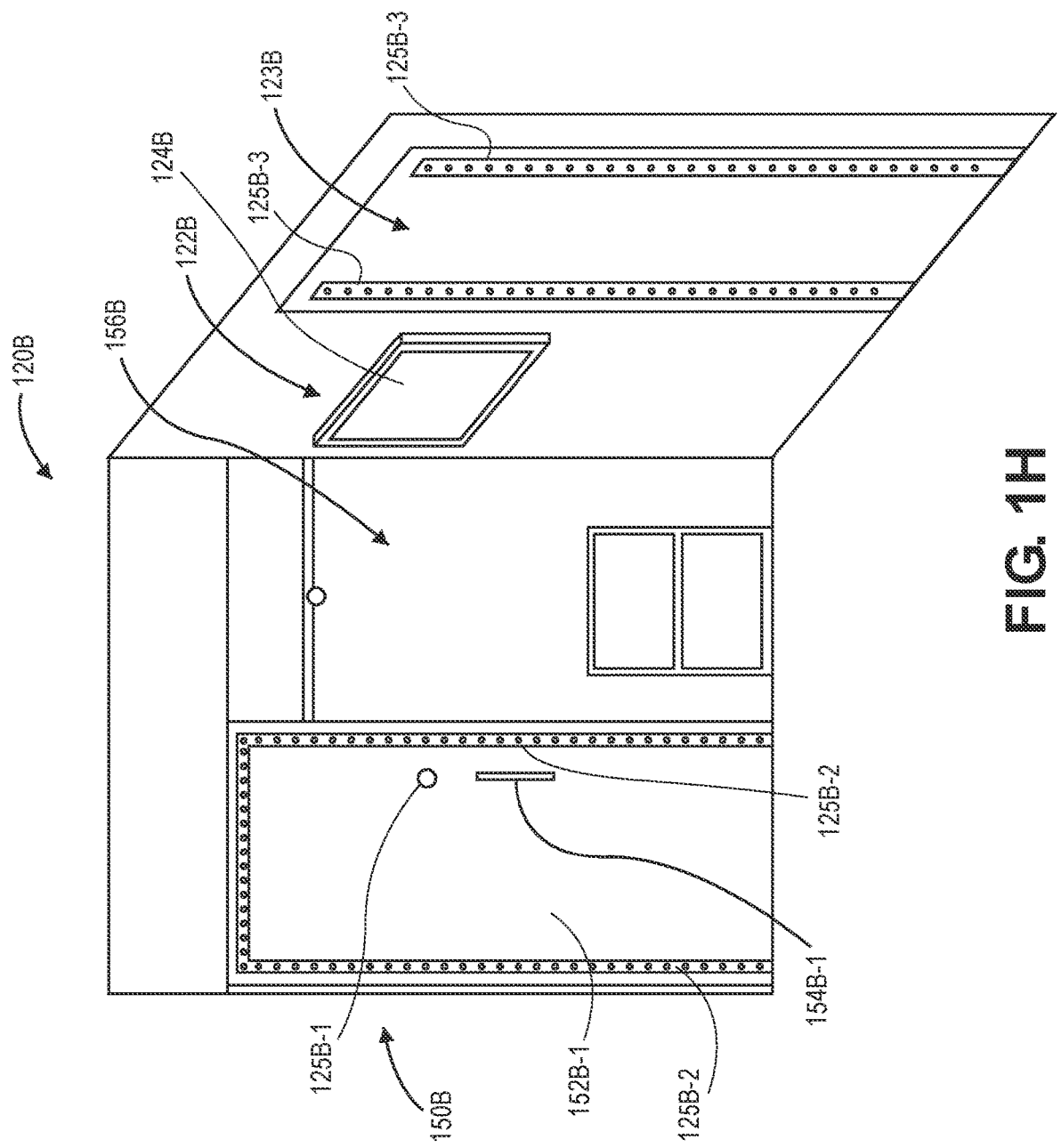

As is shown in FIG. 1H, an interior of the evaluation room 120B includes an internal door 152B-1 to the replenishment closet 150B, an open-front locker (or cabinet) 156B, a computer device 122B and a mirror 123B mounted on a wall, along with ample space for a customer to enter the evaluation room 120B and try on any number of items e.g., in front of the mirror 123B or any other feature within the evaluation room 120B.

The computer device 122B may include an interactive touchscreen display 124B that displays information or data regarding a customer, items within the evaluation room 120B, or any other information or data in one or more user interfaces. Alternatively, or in addition to the touchscreen display 124B, the computer device 122B may include any number of other input/output devices. The computer device 122B may be a tablet computer or any general-purpose device or machine, or a dedicated device or machine, that may be mounted to a wall or other object within the evaluation room 120B or provided on a table or other surface within the evaluation room 120B. In some implementations, customers may be prompted to request additional items be delivered to the evaluation room 120B, to confirm that the customers still intend to evaluate items within the evaluation room 120B, or to indicate that the customers intend to temporarily delay or revoke their interest in any items by one or more gestures or other interactions with the computer device 122B.

The mirror 123B may be any surface, object or feature that is constructed or configured to reflect light, e.g., an image of an object in front of at least a portion of the mirror 123B, such as a customer wearing one or more articles of clothing. The mirror 123B may be an article or feature that is mounted to one of the walls of the evaluation room 120B, such as is shown in FIG. 1H, or, alternatively, a free-standing article or feature, such as a piece of furniture.

The replenishment closet 150B may be a space, an area, or a portion of or adjacent to the evaluation room 120B that is set off or separated from an enclosure defined by the evaluation room 120B, e.g., by the internal door 152B-1 and any number of walls or other barriers, and is intended for the temporary passage or storage of items therethrough or therein. In some implementations, the replenishment closet 150B may include one or more bars, baskets, bins, drawers, hooks, shelves, trays or other components for accommodating items thereon or therein. The replenishment closet 150B may also be sized to accommodate the passage of not only items but also persons (e.g., associates) or carts or other mobile systems.

The internal door 152B-1 may be a bifold door, a flush door, a hinged door, a pivoting door, a pocket door, a revolving door, a roller door, a sliding door, a swing door, or any other type or form of door, or any number of such doors, that may be unlocked and opened to enable access to the evaluation room 120B from the replenishment closet 150B or vice versa, or locked and opened to inhibit access to the evaluation room 120B from the replenishment closet 150B or vice versa. The internal door 152B-1 may further include an access control system 154B-1 (e.g., a smart lock or a smart door) or another control system for controlling operation of the internal door 152B-1, e.g., by transmitting or receiving one or more codes or other information or data via one or more wireless networks, such as Bluetooth® or any Wireless Fidelity (or "Wi-Fi") protocol. Alternatively, operation of the interior door 152B-1 may be manually entered by the entry of a passcode, a password, an identifier, a credential, or any other information or data into a keypad or other system of the access control system 154B-1. Furthermore, in some implementations, the access control system 154B-1 may be outfitted or configured with one or more imaging devices or other sensors to capture information or data regarding one or more body parts of a customer, an associate or other personnel, such as a scan of a face, a hand or another body part, and confirming that the customer, the associate or the other personnel is authorized to pass through the interior door 152B-1 based on information or data captured by the imaging devices or other sensors. The access control system 154B-1 may also include any number of handles, knobs or other operators.

The open-front locker 156B may be a space, an area, or a portion of the evaluation room 120B for accommodating one or more items therein. The open-front locker 156B is defined by walls or other barriers on three sides, and opens to the enclosure defined by the evaluation room 120B. The open-front locker 156B may include one or more bars, baskets, bins, drawers, hooks, shelves, trays or other components for accommodating items thereon or therein.

The evaluation room 120B further includes a plurality of feedback devices 125B-1, 125B-2, 125B-3 that may be programmed or configured to generate audible or visible feedback within the enclosure of the evaluation room 120B, to indicate a status or condition of the replenishment closet 150B, or an extent to which the replenishment closet 150B may be accessed, e.g., by a customer within the evaluation room 120B. For example, in some implementations, the feedback device 125B-1 may be a visible, colored light (e.g., a red light) that may illuminate when the interior door 152B-1 is in a locked state, or when access to the replenishment closet 150B from within the enclosure of the evaluation room 120B is otherwise restricted, or for any other reason. For example, in some implementations, where the feedback device 125B-1 is a visible light that may be viewed by a customer within the evaluation room 120B, the feedback device 125B-1 may illuminate when the interior door 152B-1 is in a closed position or in a locked state, thereby indicating that an associate is or may be accessing the replenishment closet 150B.

In some implementations, the feedback device 125B-2 may be a light, or a strip or other collection of lights, provided around at least a portion of a perimeter of the internal door 152B-1 that may illuminate when items are determined to be within the replenishment closet 150B, when the interior door 152B-1 is in an unlocked state, or when access to the replenishment closet 150B from within the enclosure of the evaluation room 120B is otherwise enabled, or for any other reason. Similarly, the feedback device 125B-3 may also be a light, or a strip or other collection of lights, provided around at least a portion of a perimeter of the mirror 123B that may illuminate when items are determined to be within the replenishment closet 150B, when the interior door 152B-1 is in an unlocked state, or when access to the replenishment closet 150B from within the enclosure of the evaluation room 120B is otherwise enabled, or for any other reason. Alternatively, in some implementations, the feedback devices 125B-2, 125B-3 may be utilized to provide additional light within the evaluation room 120B when not being utilized for providing feedback.

Figure 1I:
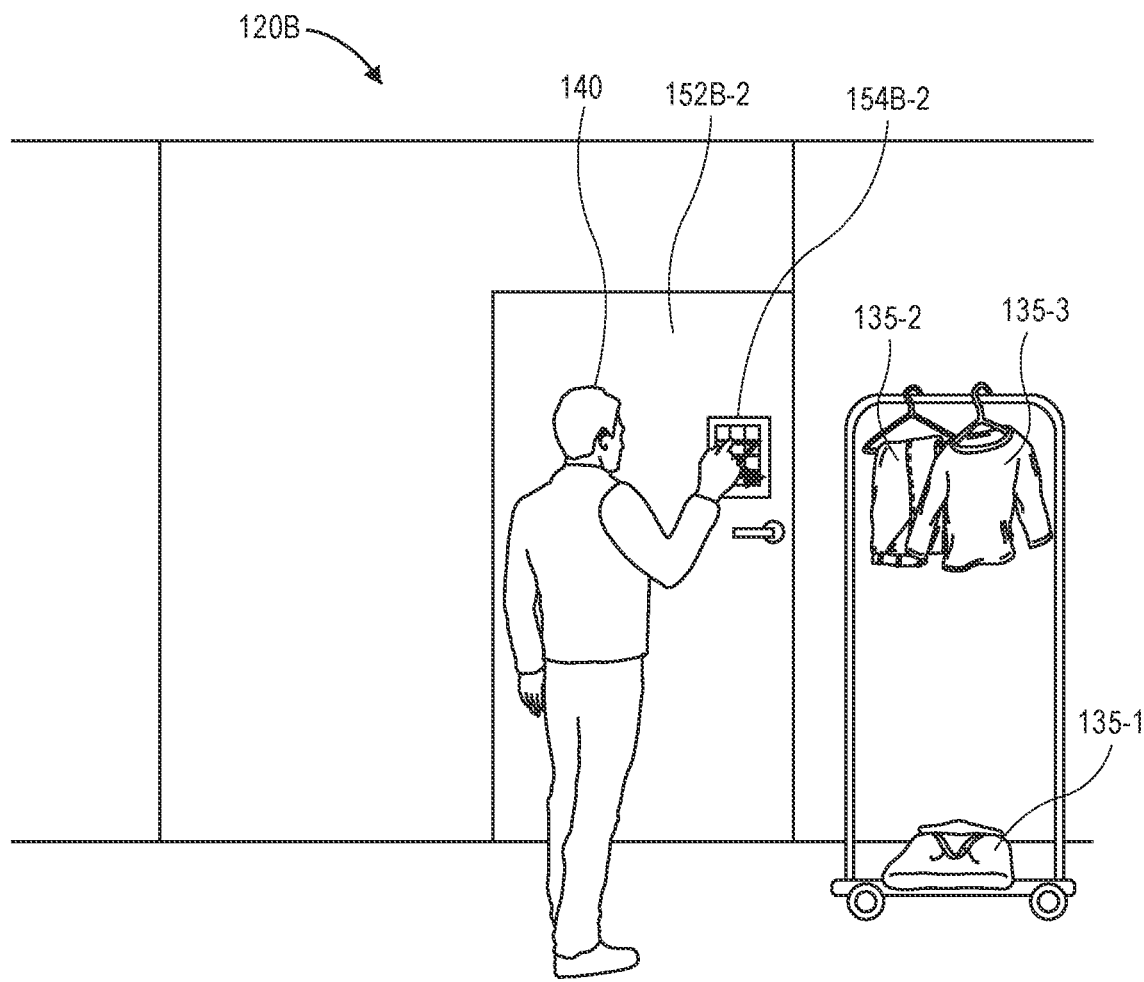

As is discussed above, a replenishment closet may be used to deliver items to an evaluation room (e.g., a fitting room) from an inventory area of a materials handling facility. As is shown in FIG. 1I, an associate 140 may retrieve the item 135-1 and two of the recommended items 135-m, including an item 135-2 (viz., a pair of jeans) and an item 135-3 (viz., a shirt), from the inventory area 145 and transport the items 135-1, 135-2, 135-3 to an external door 152B-2 of the replenishment closet 150B on a cart or another mobile system. The external door 154B-2 may be of the same type or form as the interior door 154B-1, or of a different type or form, and may include an access control system 154B-2 (e.g., a smart lock or a smart door) or another control system for controlling operation of the external door 152B-2.

As is further shown in FIG. 1I, the associate 145 may request access to the replenishment closet 150B or the evaluation room 120B by providing a passcode, a password, an identifier, a credential, or any other information or data to the access control system 154B-2, e.g., by a keypad or another feature, or by way of a mobile device. Alternatively, the associate 145 may request access to the replenishment closet 150B or the evaluation room 120B in any other manner.

Figure 1J:
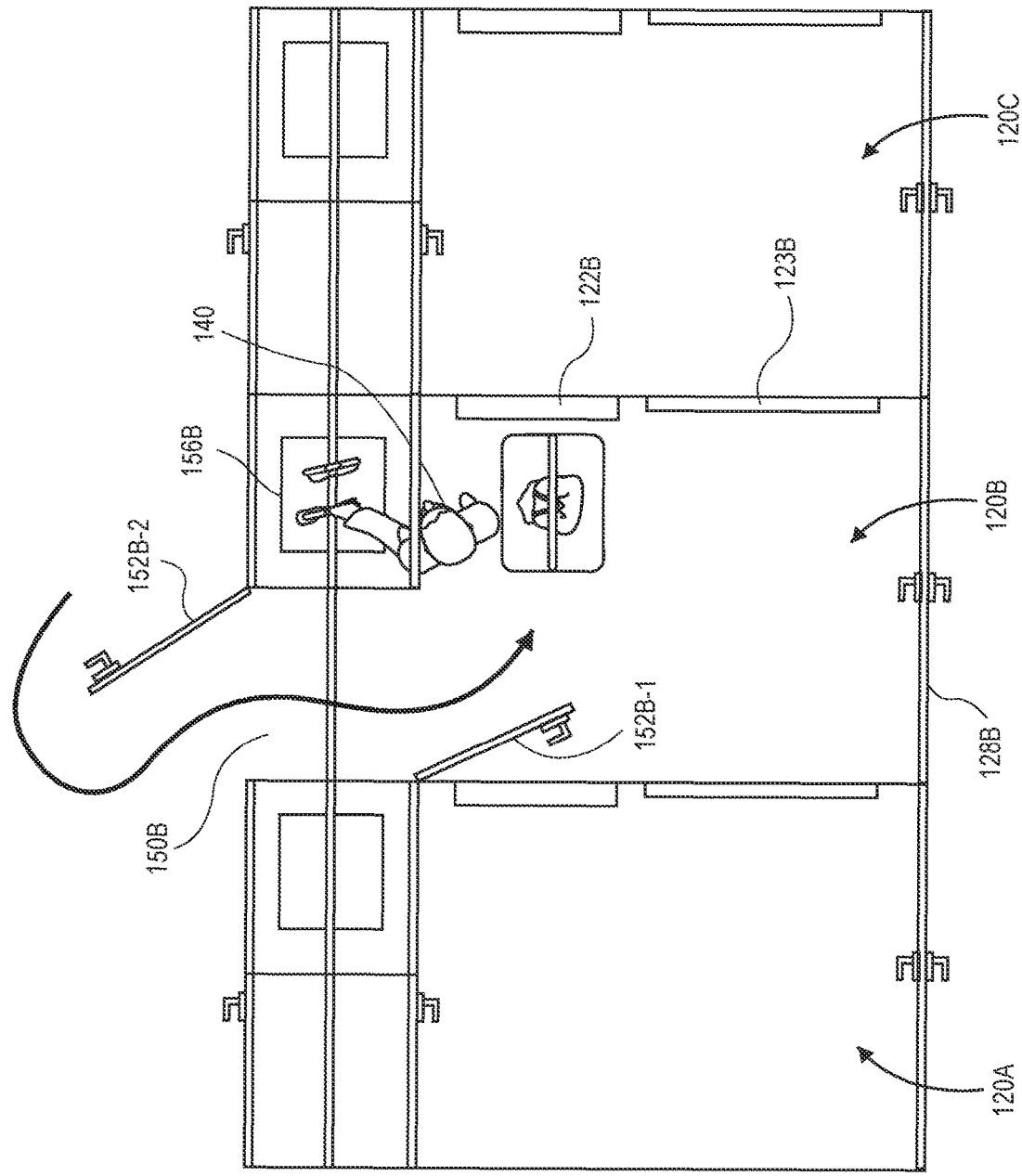
Figure 1K:
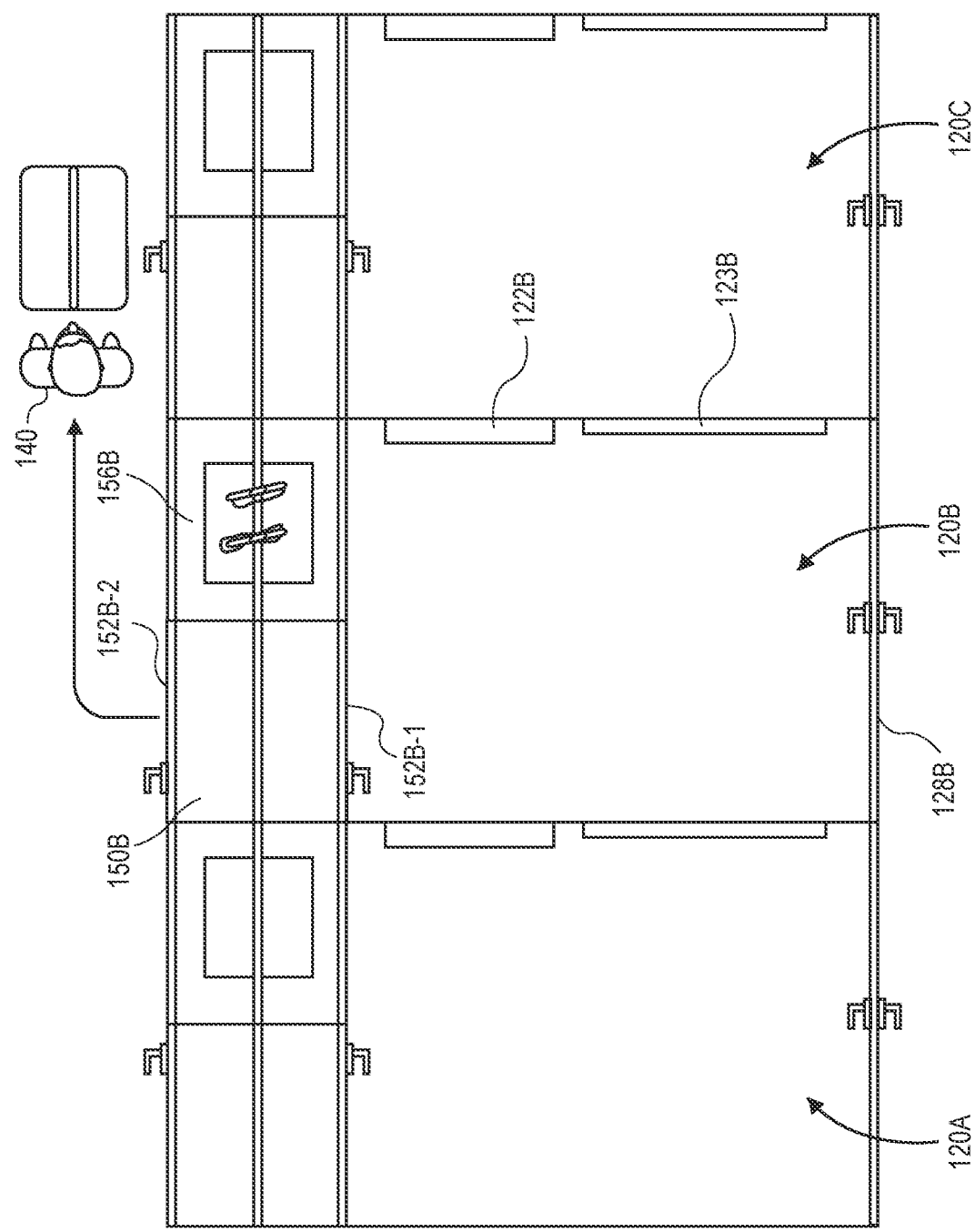

FIGS. 1J and 1K are top views of the evaluation rooms 120A, 120B, 120C and the replenishment closets 150A, 150B, 150C. As is shown in FIG. 1J, upon being authenticated by the access control system 154B-2 or otherwise, the associate 140 is granted access to the evaluation room 120B by way of the replenishment closet 150B. For example, as is shown in FIG. 1J, the associate 140 may be authorized to enter the replenishment closet 150B by way of the external door 152B-2, and to enter the enclosure of the evaluation room 120B by way of the internal door 152B-1, along with the items 135-1, 135-2, 135-3. Additionally, upon the authentication of the associate 140, a door 128B or another portal for accessing the evaluation room 120B from the shopping area 130 may be placed in a locked state, thereby preventing any customers or other persons from entering the evaluation room 120B as the associate 140 is delivering items therein by way of the replenishment closet 150B.

As is shown in FIG. 1K, after staging the items 135-1, 135-2, 135-3 within the open-front locker 156B of the evaluation room 120B, the associate 140 departs the evaluation room 120B by way of the internal door 152B-1 and the external door 152B-2, each of which may return to a closed position upon the departure of the associate 140.

Figure 1L:
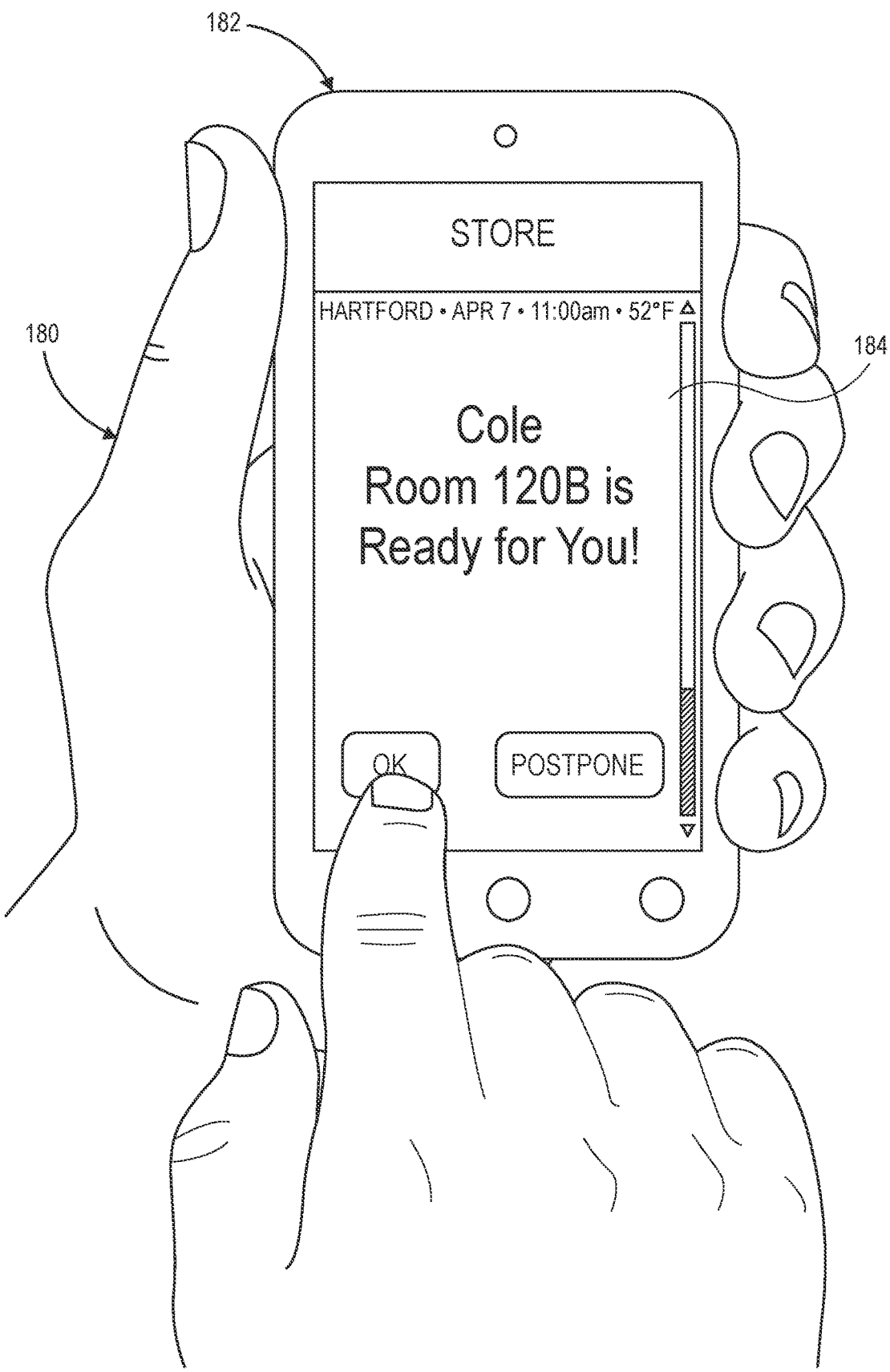

As is shown in FIG. 1L, and also upon the departure of the associate 140 from the evaluation room 120B and the replenishment closet 150B, the customer 180 may be informed that the evaluation room 120B is ready for the customer 180, e.g., by transmitting one or more electronic messages or other information or data for display in a user interface on the touchscreen display 184. In some implementations, the customer 180 may be prompted to confirm that he or she is ready to evaluate the items 135-1, 135-2, 135-3, or to indicate that he or she would like to temporarily delay an evaluation of the items 135-1, 135-2, 135-3 by one or more gestures or other interactions with the touchscreen display 184, before proceeding to the evaluation room 120B.

Figure 1M:
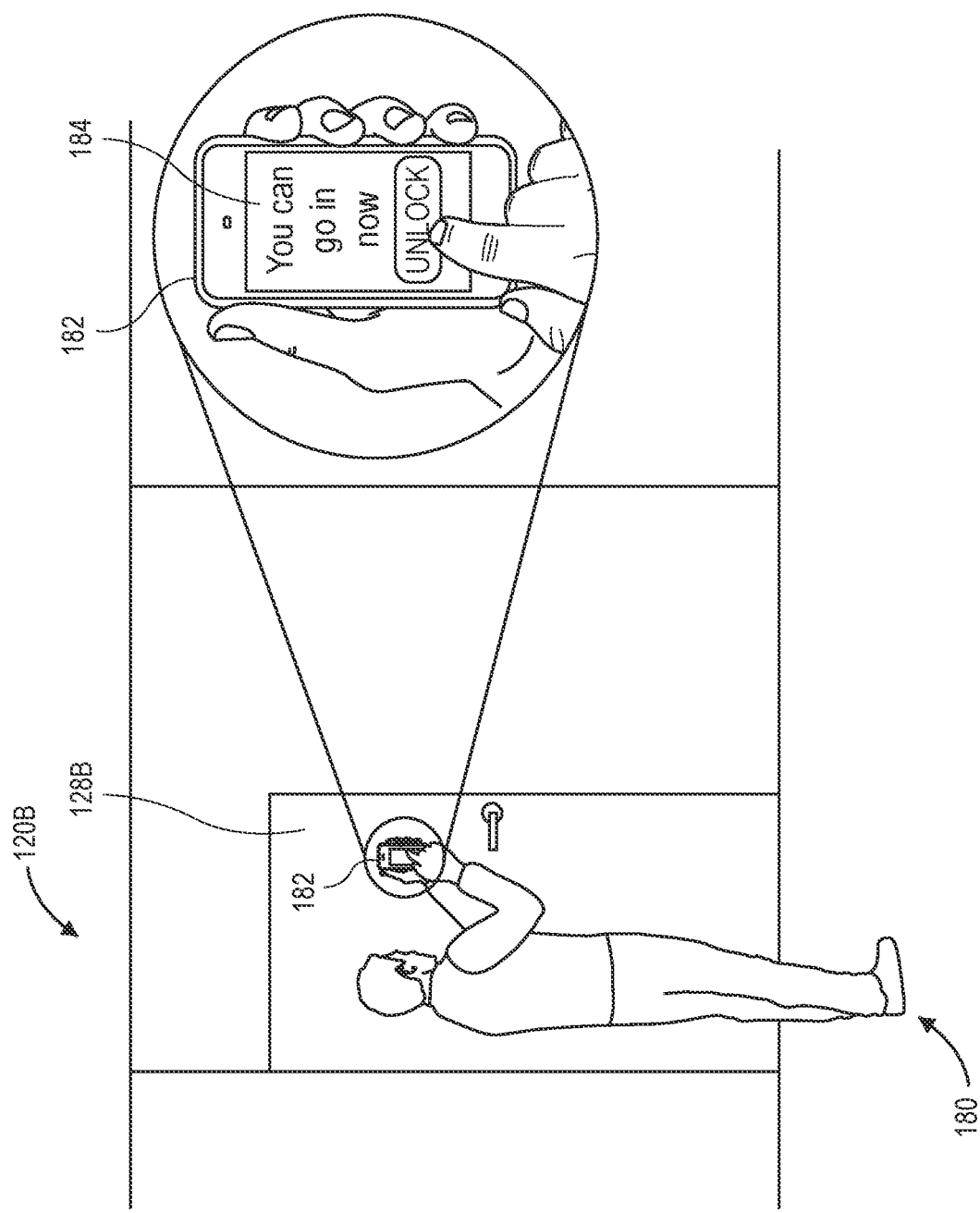

As is shown in FIG. 1M, upon arriving at the evaluation room 120B, the customer 180 may be informed that he or she is permitted to enter the evaluation room 120B, e.g., by transmitting one or more electronic messages or other information or data for display in a user interface on the touchscreen display 184. The customer 180 may indicate or confirm his or her intent to enter the evaluation room 120B by one or more gestures or other interactions with the touchscreen display 184.

Figure 1N:
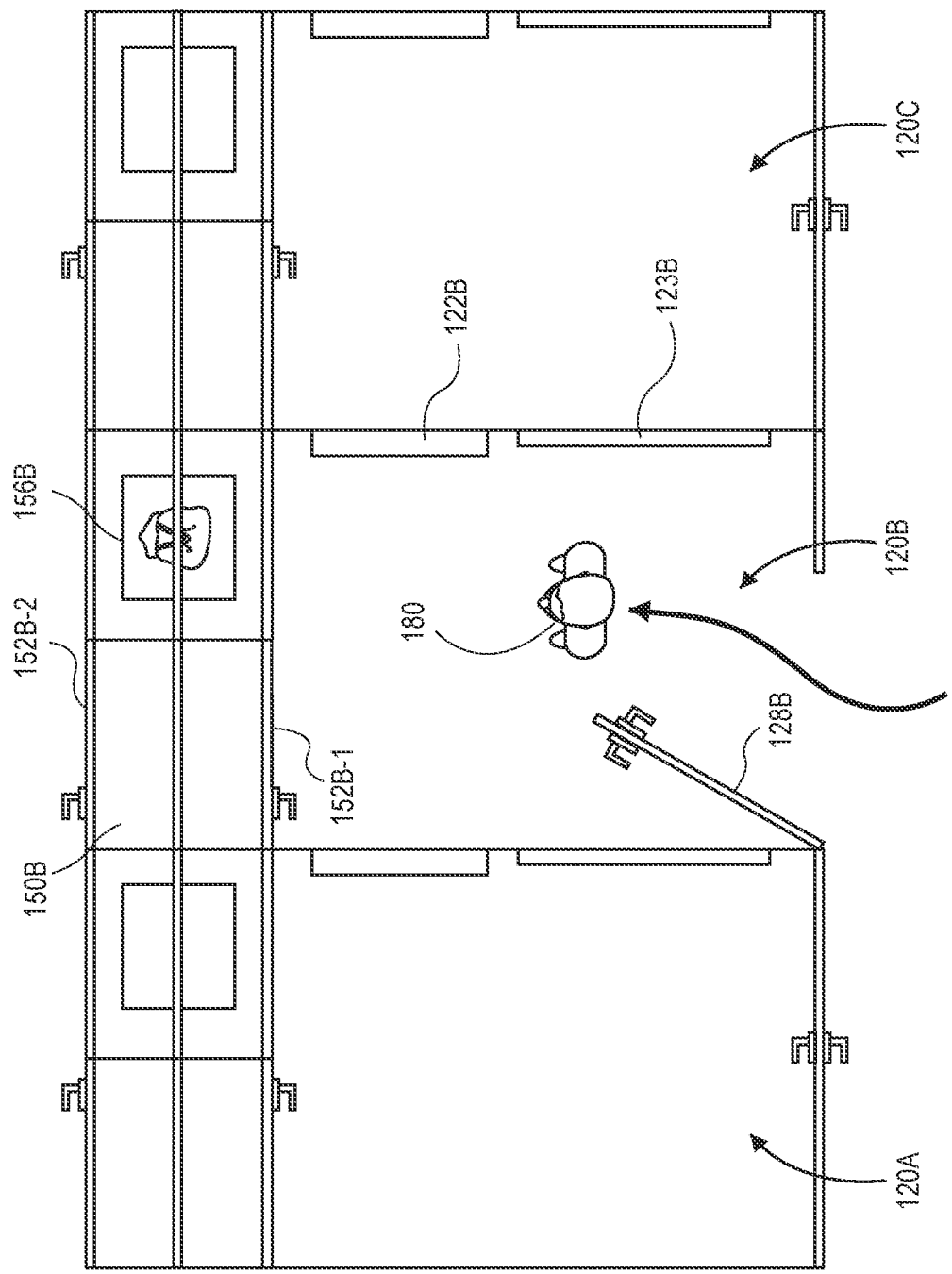

FIG. 1N is a top view of the evaluation rooms 120A, 120B, 120C and the replenishment closets 150A, 150B, 150C. As is shown in FIG. 1N, upon authorizing the customer 180, the door 128B is placed in an unlocked state, and the customer 180 is granted access to and enters the evaluation room 120B by way of the door 128B. As is shown in FIG. 1O, within the evaluation room 120B, the customer 180 may visually or manually evaluate any of the items 135-1, 135-2, 135-3, such as by trying the items on in front of the mirror 123B.

Additionally, once the customer 180 is confirmed to have entered the evaluation room 120B, the door 128B may be placed in a locked state, thereby preventing any other customers or other personnel from entering the evaluation room 120B by way of the door 128B. Likewise, upon the authentication of the customer 180, the internal door 152B-1 and the external door 152B-2 may be placed in a locked state, thereby preventing any associates or other persons from entering the evaluation room 120B as the customer 180 is evaluating items therein by way of the replenishment closet 150B.

Figure 1P:
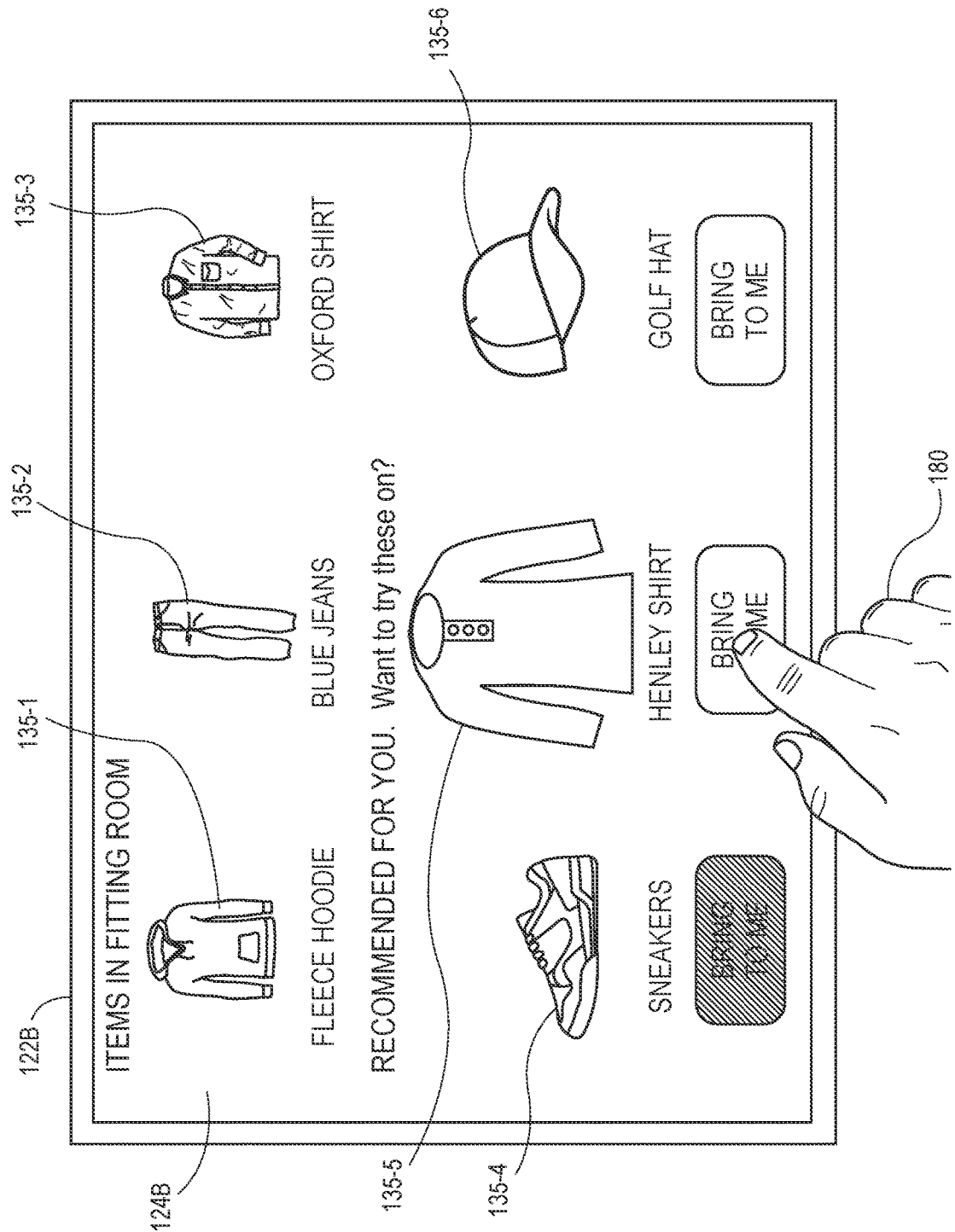

Also within the evaluation room 120B, the customer 180 may request that any number of other items be delivered to him or her in any manner, such as by way of one or more gestures or other interactions with the computer device 122B. As is shown in FIG. 1P, information or data regarding the items 135-1, 135-2, 135-3 within the evaluation room 120B, as well as any other of the recommended items 135-m, is shown in a user interface on the touchscreen display 124B. For example, the user interface identifies item 135-4 (viz., a pair of sneakers), item 135-5 (viz., a Henley shirt) and item 135-6 (viz., a golf hat), and includes one or more buttons or other interactive features by which the customer 180 may request to have any of the items 135-4, 135-5, 135-6, or any other items, brought to the evaluation room 120B.

Figure 1Q:
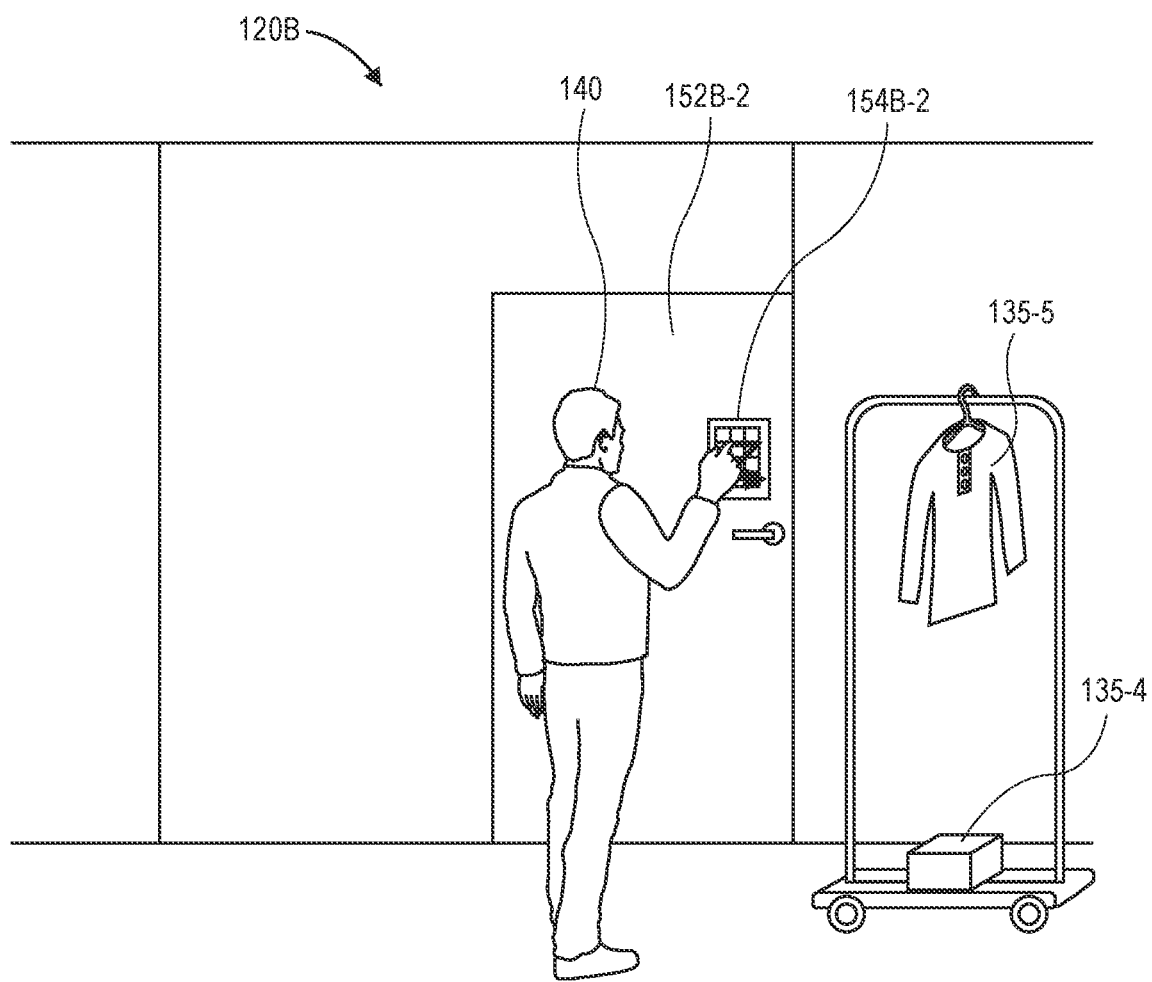

As is shown in FIG. 1Q, after the customer 180 requested that the items 135-4, 135-5 be delivered to him or her in the evaluation room 120B as shown in FIG. 1P, the associate 140 returns to the external door 152B-2 after having retrieved the items 135-4, 135-5, e.g., from the inventory area 145. The associate 140 may again request access to the evaluation room 120B via the internal door 152B-1, e.g., to stage the items 135-4, 135-5 therein, in the same manner that the associate 140 requested access to the evaluation room 120B as shown in FIG. 1I, or in any other manner.

Figure 1S:
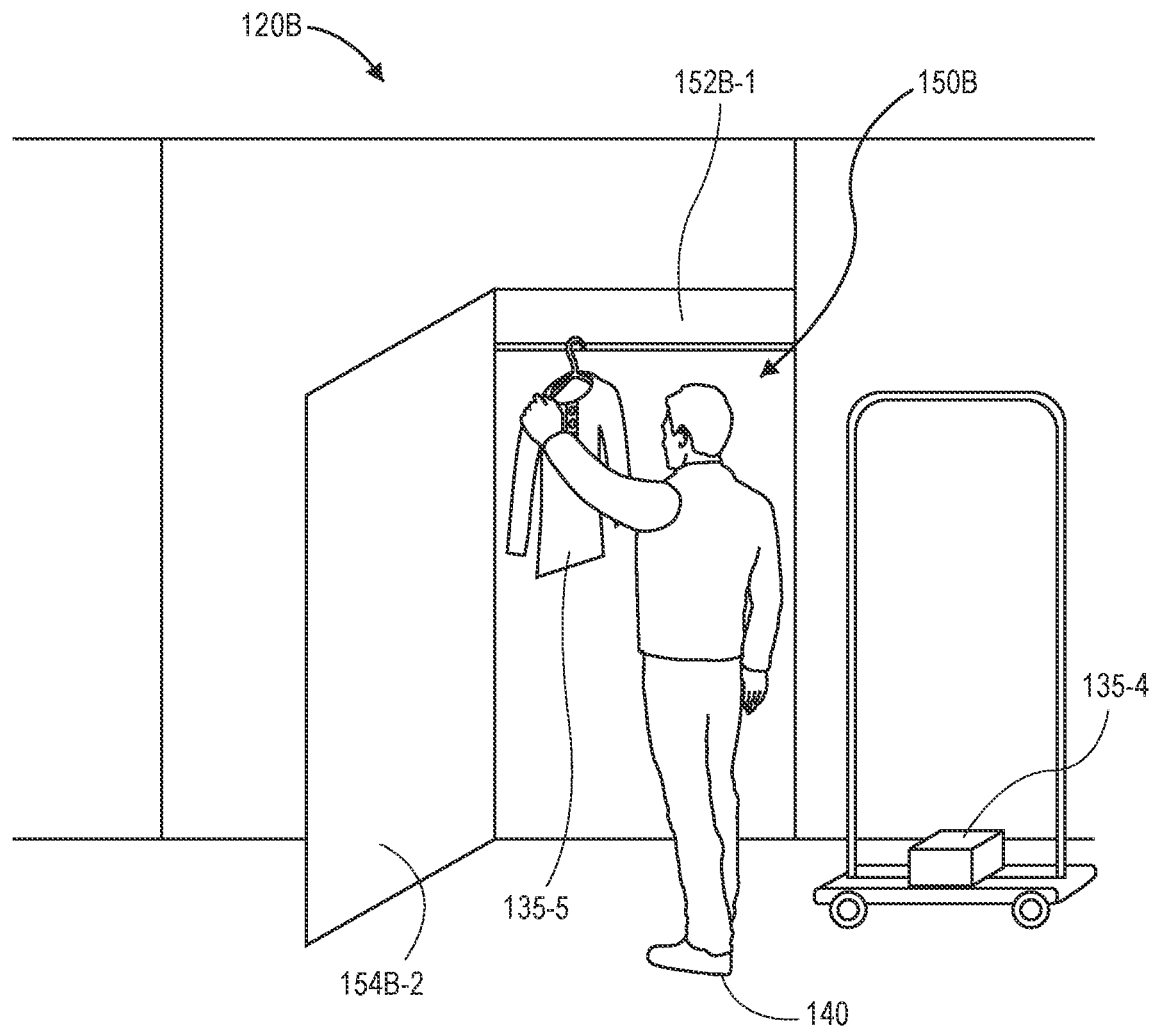

FIG. 1R is a top view of the evaluation rooms 120A, 120B, 120C and the replenishment closets 150A, 150B, 150C. As is shown in FIG. 1R, prior to granting the associate 140 access to the replenishment closet 150B via the external door 152B-2, the internal door 152B-1 may be confirmed to be in a closed position and may then be placed in a locked state. Placing the internal door 152B-1 in the locked state while the associate 140 has access to the replenishment closet 150B ensures that the customer 180 may evaluate any of the items 135-1, 135-2, 135-3, such as to try the item 135-1 on, with privacy within the enclosure of the evaluation room 120B. As is shown in FIG. 1S, the associate 140 stages the items 135-4, 135-5 within the replenishment closet 150B via the external door 152B-2. The associate 140 may report that the items 135-4, 135-5 have been staged within the replenishment closet 150B, or the staging of the items 135-4, 135-5 therein may be determined, in any manner. For example, the associate 140 may provide one or more indications via a mobile device or system, or may contact one or more buttons or other features (not shown) associated with the external door 152B-2. In some implementations, the staging of the items 135-4, 135-5 within the replenishment closet 150B may be inferred based on changes in a position or state of the external door 152B-2, e.g., from a closed position to an open position and back to a closed position, or from a locked state to an unlocked state and back to a locked state. Alternatively, in some implementations, the staging of the items 135-4, 135-5 within the replenishment closet 150B may be determined based on information or data captured by one or more sensors (e.g., imaging devices) associated with the inventory area 145 or the replenishment closet 150B.

Figure 1T:
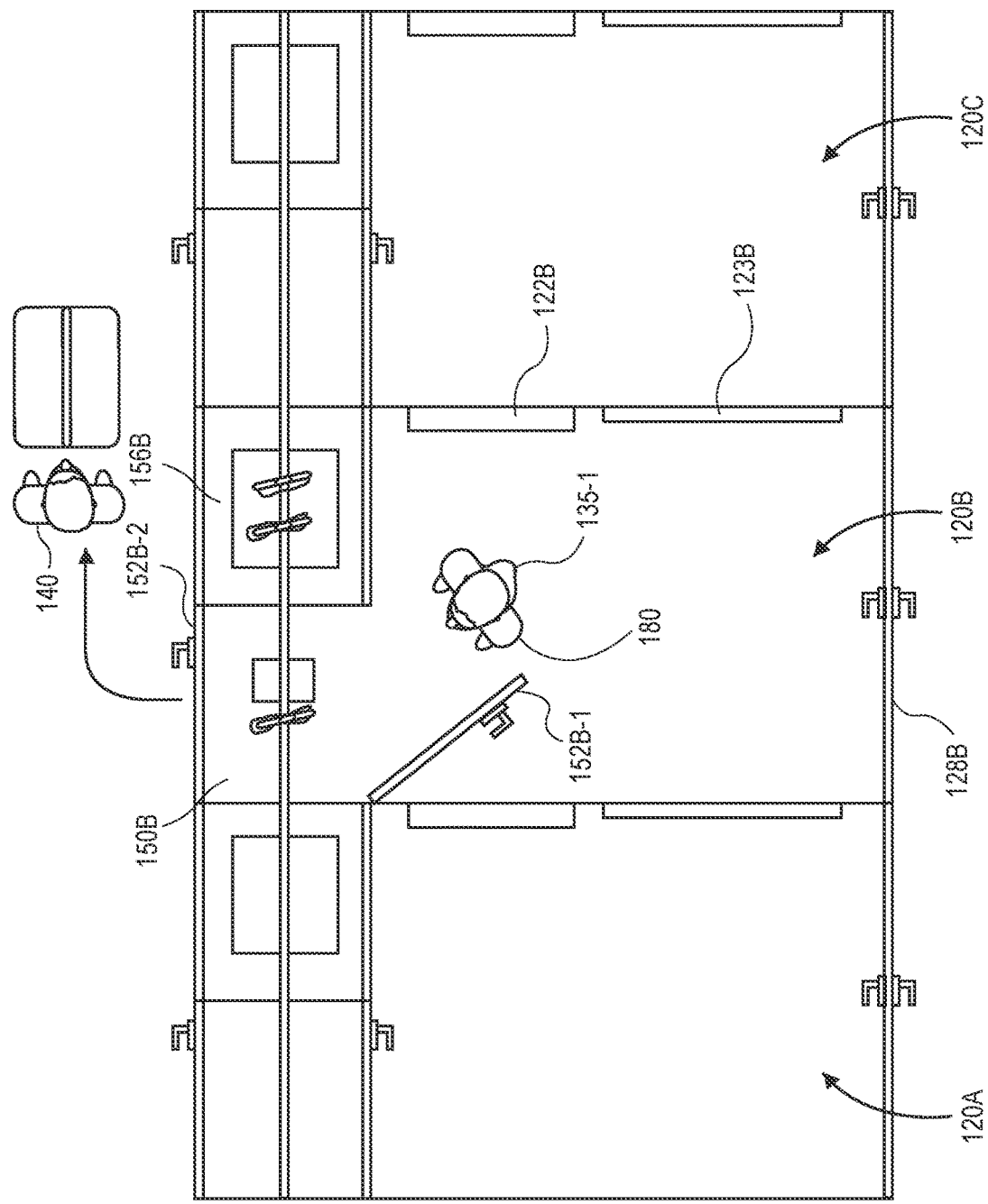

As is shown in FIG. 1T, after the associate 140 has staged the items 135-4, 135-5 in the replenishment closet 150B, and the external door 152B-2 is confirmed to be in a closed position, the external door 152B-2 may be placed in a locked state, the internal door 152B-1 may be placed in a locked state, and the customer 180 may be permitted to access the replenishment closet 150B via the internal door 152B-1. Placing the external door 152B-2 in the locked state while the customer 180 has access to the replenishment closet 150B maintains the privacy of the customer 180 within the evaluation room 120B. As is shown in FIG. 1U, the customer 180 is able to receive additional items, viz., the items 135-4, 135-5, from the replenishment closet 150B and to evaluate those additional items with the items that the customer 180 wore into the evaluation room 120B, or with the items 135-1, 135-2, 135-3 that were staged therein prior to his or her arrival.

Accordingly, the systems and methods of the present disclosure are directed to delivering items to evaluation rooms (e.g., fitting rooms) at materials handling facilities, while maintaining the privacy of customers within such evaluation rooms. In some implementations, an evaluation room may include a replenishment closet or, simply, a closet, that may be accessed by a customer within the evaluation room, and by an associate outside of the fitting room, albeit not at the same time. The replenishment closet may include an internal door (or a first door) between an interior enclosure of the evaluation room and an interior enclosure of the replenishment closet. The internal door may be placed in an open position or a closed position, or in any intervening position between the open position and the closed position, and in a locked state or an unlocked state. Likewise, the replenishment closet may also include an external door (or a second door) between the interior enclosure of the replenishment closet and an inventory area or another space outside of the evaluation room. The external door may also be placed in an open position or a closed position, or in any intervening position between the open position and the closed position, and in a locked state or an unlocked state.

In some implementations of the present disclosure, a customer at a clothing store or another materials handling facility may request that one or more items selected by or on behalf of the customer be staged in an evaluation room (e.g., a fitting room). After the items are staged in an evaluation room, the customer may enter the evaluation room to try one or more of the items on, or to otherwise evaluate the items for suitability for his or her purposes.

When the customer wishes to evaluate one or more additional items other than those that are present within the evaluation room, the customer may request that such items be delivered to the customer in the evaluation room. The customer may request the additional items by one or more gestures or other interactions with a computer system provided within the evaluation room, by one or more voice commands, or in any other manner.

An associate may retrieve the additional items requested by the customer, or any other items, from one or more inventory areas at the clothing store, and request access to the replenishment closet by way of the external door. When the internal door is in a closed position, the internal door may be placed in a locked state, and the external door may be placed in an unlocked state. With the external door in the unlocked state, the associate may place the external door in an open position, and stage the items within the replenishment closet. While the internal door is in the locked state, and the associate is staging items in the replenishment closet, feedback may be provided to the customer within the evaluation room, indicating that the replenishment closet is inaccessible and that items are being staged therein. Such feedback may include, but need not be limited to, the illumination of one or more lights that are provided in prominent or visible locations within the evaluation room, such as on walls, doors, or around fixtures or features; the display of information or data on a computer display within the evaluation room; the playing of sounds via one or more speakers within the evaluation room; or any other feedback.

After the items have been staged within the replenishment closet, and the external door has been placed in a closed position, the external door may be placed in a locked state, and the internal door may be placed in an unlocked state. Once the internal door has been placed in the unlocked state, additional feedback may be presented to the customer within the evaluation room, to indicate that the additional items have been staged within the replenishment closet, and that the replenishment closet is now accessible to the customer. Such additional feedback may include the illumination of other lights within the evaluation room; the display of other information or data on the computer display; the playing of other sounds; or any other feedback.

Processes for staging additional items in an evaluation room via a replenishment closet may be repeated in response to any number of requests, and for any number of additional items. Alternatively, a replenishment closet may be utilized to deliver items to an evaluation room, e.g., as an initial set of items to be evaluated by a customer. For example, with a door between the evaluation room and a shopping area in a closed position, and in a locked state, the external door and the internal door to the replenishment closet may be placed in open positions, and an associate may deliver items into the evaluation room by way of both of the doors. Once the associate has departed the evaluation room, and the external door has been placed in a closed position and in a locked state, the customer may be informed that the evaluation room is ready for him or her to evaluate the initial set of items therein. Upon a request of the customer, the door between the evaluation room and the shopping area may be placed in an unlocked state and the customer may be permitted to enter the evaluation room to evaluate the initial set of items.

In some implementations, walls, doors or other components of evaluation rooms may be formed from any suitable materials, e.g., woods (such as birch or plywoods), drywall, metals (e.g., steels or aluminums), plastics, composites, or any other materials. Additionally, the doors may be bifold doors, flush doors, hinged doors, pivoting doors, pocket doors, revolving doors, roller doors, sliding doors, swing doors, or any other type or form of doors.

Figure 2A:
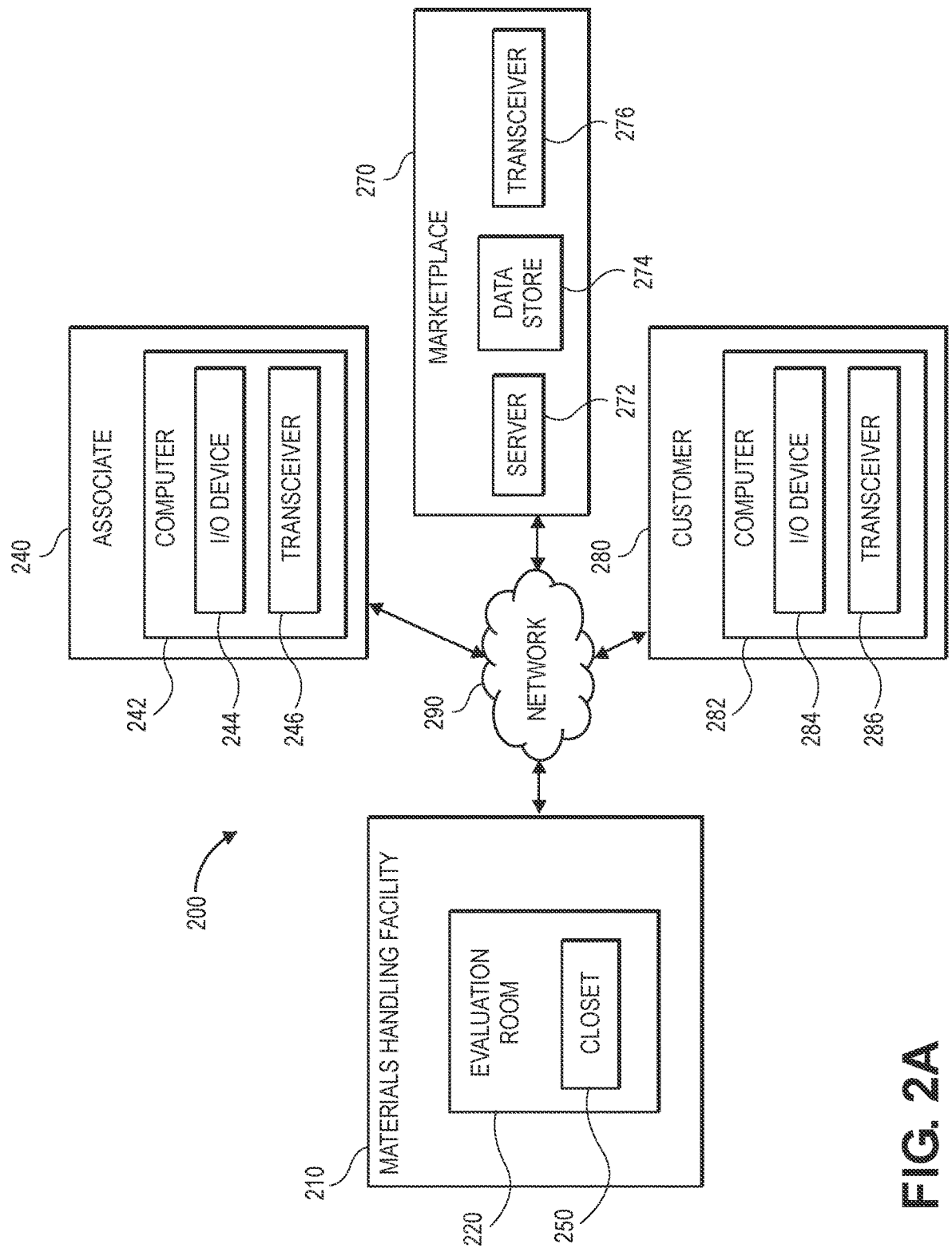
FIGS. 2A and 2B are block diagrams of one system for delivering items to evaluation rooms in accordance with implementations of the present disclosure.
Figure 2B:
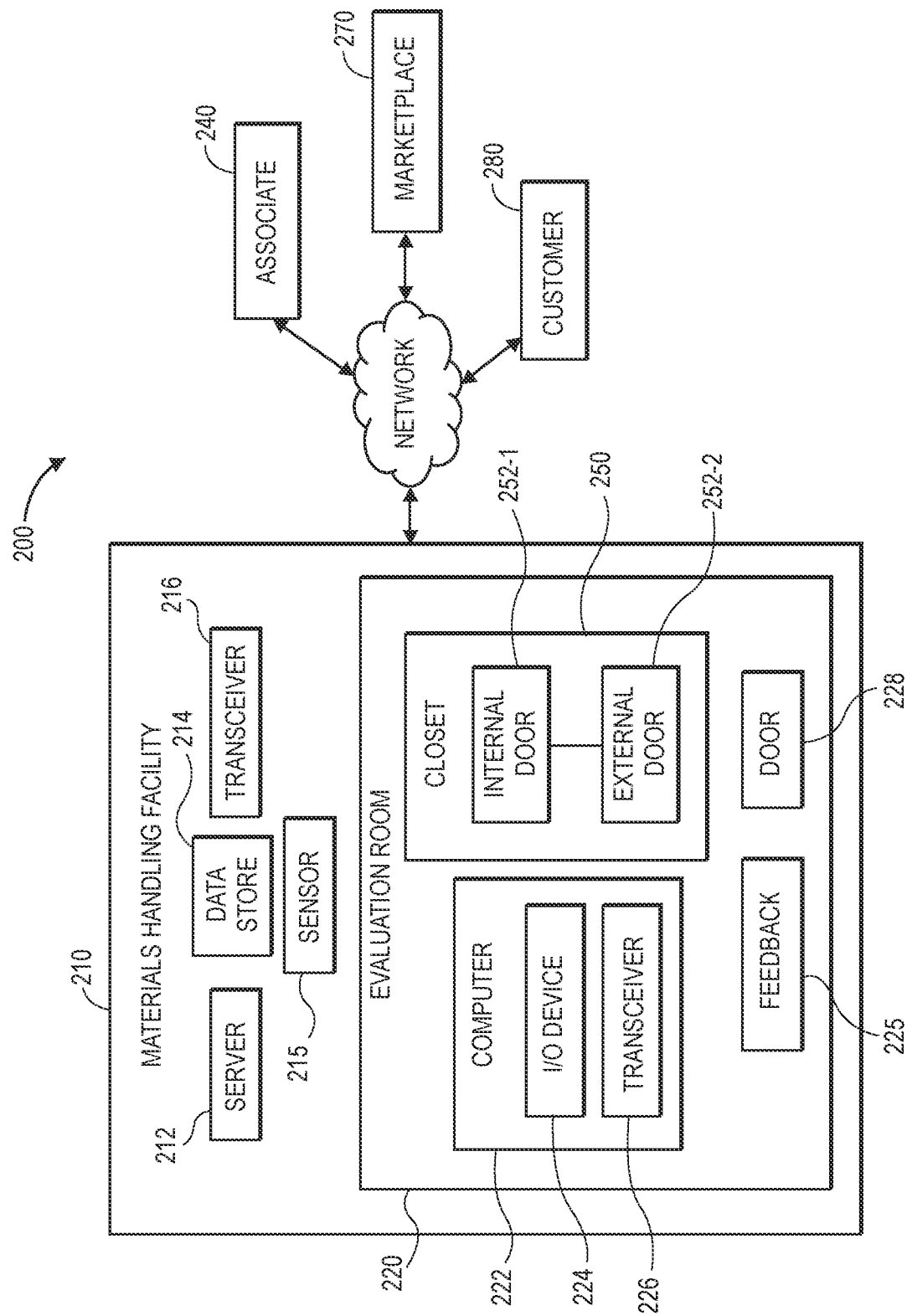

Referring to FIGS. 2A and 2B, block diagrams of one system 200 for delivering items to evaluation rooms in accordance with implementations of the present disclosure is shown. As is shown in FIGS. 2A and 2B, the system 200 includes a materials handling facility 210, an associate 240, a marketplace 270 (e.g., an electronic marketplace, or an online marketplace) and a customer 280 connected to one another over a network 290. Except where otherwise noted, reference numerals preceded by the number "2" shown in FIG. 2A or 2B indicate components or features that are similar to components or features having reference numerals preceded by the number "1" shown in FIGS. 1A through 1U.

The materials handling facility 210 may be any facility that is adapted to receive, store, process and/or distribute items from a variety of sources to a variety of destinations. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations.

As is shown in FIGS. 2A and 2B, the materials handling facility 210 includes a networked computer infrastructure for performing various computer-related functions associated with the receipt, storage, processing and distribution of such items, including one or more physical computer servers 212, data stores (e.g., databases) 214, sensors 215 and/or transceivers 216, that may be provided in the same physical location as the materials handling facility 210, or in one or more alternate or virtual locations, e.g., in a "cloud"-based environment. In some implementations, the servers 212, the data stores 214, the sensors 215 and/or the transceivers 216 or any number of other computing devices or resources may further execute any type of computer-based function or compute any type or form of calculation, including but not limited to any formulas, equations, algorithms or techniques for determining one or more probabilities or performing any number of statistical tests. In some implementations, the servers 212, the data stores 214, the sensors 215 and/or the transceivers 216 may be configured to execute one or more machine learning models, systems or techniques.

The sensor 215 may be any device or system configured to capture information or data regarding one or more internal or external spaces of the materials handling facility 210. In some implementations, the sensor 215 may be a camera, an imaging device, or any form of optical recording device that may be used to photograph or otherwise record imaging data of structures, facilities or items within the materials handling facility 210, or for any other purpose. The sensor 215 may be mounted in any specific location or orientation within the materials handling facility 210, e.g., above, below or along-side one or more inventory areas or stations for receiving or distributing items. Alternatively, the sensor 215 may be provided in any open or enclosed environment or space in which any number of actors (e.g., humans, other animals or machines) may execute one or more poses, gestures or other actions within one or more of their fields of view.

The sensor 215 may include one or more sensors, memory or storage components and processors, and such sensors, memory components or processors may further include one or more photosensitive surfaces, filters, chips, electrodes, clocks, boards, timers or any other relevant features (not shown). The sensor 215 may be homogenous or heterogeneous in nature, and may include manual or automatic features for modifying their respective fields of view or orientations. For example, the sensor 215 may be configured in a fixed position, or with a fixed orientation. Alternatively, the sensor 215 may include one or more motorized features for adjusting a position or an orientation of the sensor 215. Furthermore, in some implementations, the sensor 215 may include one or more RFID readers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The transceiver 216 may be configured to enable the materials handling facility 210 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 216 may further include or be in communication with one or more I/O interfaces, network interfaces and/or input/output devices, and may be configured to allow information or data to be exchanged between one or more of the components of the materials handling facility 210, or to one or more other computer devices or systems (e.g., other aerial vehicles, not shown) via the network 290. For example, in some implementations, the transceiver 216 may be configured to coordinate I/O traffic between the server 212 or the data store 214 and the associate 240, the marketplace 270 or the customer 280. The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the USB standard. In some other implementations, functions of the transceiver 216 may be split into two or more separate components, or integrated with the server 212.

In some implementations, the server 212 (or any other computer devices or systems associated with the materials handling facility 210) may be configured to execute any number of calculations or functions associated with training or utilizing one or more statistical models or other machine learning systems or techniques. For example, in some implementations, the server 212 may train an artificial neural network or other machine learning model in a supervised or unsupervised manner. In some implementations, the machine learning model may include any number of neurons in any number of layers, including an input layer, an output layer, and one or more intervening hidden layers. Each of the neurons in a layer within an artificial neural network may receive an input and generate an output in accordance with an activation or energy function, with parameters corresponding to the various strengths or synaptic weights, e.g., in the form of a sigmoid function, wherein an output thereof may have a range of zero to one or 0 to 1, a hyperbolic tangent function, wherein an output thereof may have a range of negative one to positive one, or −1 to +1, or any others. A statistical model, such as an artificial neural network, a factorization method or analysis, a generative model, a gradient boosted decision tree, a K-means clustering analysis, a nearest neighbor method or analysis, a Random Forest algorithm, a similarity measure, or a support vector machine, may be further trained using any information, data or metadata. Once a statistical model is trained, the server 212 may utilize the statistical model to perform any task or function.

As is further shown in FIG. 2, the materials handling facility 210 further includes an evaluation room 220 (or a fitting room, a changing room, a dressing room or a locker room), which may be any section or area of the materials handling facility 210 within which one or more customers, e.g., the customer 280, may evaluate one or more items prior to determining whether to purchase any of such items. For example, the evaluation room 220 may be partially or entirely enclosed, or access to the evaluation room 220 may be partially or entirely restricted, e.g., by one or more doors, curtains or like systems. Moreover, the evaluation room 220 also includes a computer 222 having an input/output device 224 and a transceiver 226, a feedback device 225, and a closet 250 (e.g., a replenishment closet) having an internal door 252-1 and an external door 252-2. The evaluation room 220 may further include any number of other fixtures or features, such as furniture, mirrors, or apparatuses for supporting or hanging one or more articles of clothing.

The computer 222 may be a tablet computer, a laptop computer, a desktop computer, a mobile device (e.g., smartphone), a wristwatch, a smart speaker, or other device or system having one or more processors. In some implementations, the computer 222 may be configured to receive one or more interactions by the customer 280 or any other actor (e.g., the associate 240, another customer, or a worker) regarding a selected item, or any other items, such as one or more complementary items, which may be made by way of the input/output device 224. For example, where the computer 222 features a touchscreen display, one or more user interfaces may be rendered thereon, e.g., by a browser or another application, and an actor may interact with one or more buttons or other selectable features rendered thereon. In some implementations, the interactions may indicate a preference for a selected item, or a preference for one or more other items. In some other implementations, the interactions may include or indicate a request for additional complementary items, an instruction to execute a transaction for a selected item or any complementary items, or any other action or expression of intent regarding one or more items, including but not limited to an indication that the actor is not interested in any items. The transceiver 226 may share any number of attributes or features in common with the transceivers 216 of the materials handling facility 210, or may have any number of other attributes or features.

The feedback device 225 may be any system provided within or in association with the evaluation room 220 or the closet 250 for generating feedback to be seen, heard or otherwise sensed by persons within the evaluation room 220, e.g., the customer 280. In some implementations, the feedback device 225 may be one or more light-emitting diodes (or "LED"), one or more liquid crystal displays (or "LCD"), incandescent bulbs, compact and/or linear fluorescent bulbs, halogen lamps, metal halide lamps, neon lamps, sodium lamps or any other type or form of lights configured to project light at any frequency, wavelength or intensity. For example, in some implementations, the feedback device 225 may be configured to emit light at a frequency, a wavelength or an intensity selected to provide one or more indications to persons within the evaluation room 220, e.g., the customer 280. For example, a feedback device 225 may be configured to emit light in a color of red, or to flash the light at various intervals, when feedback in the form of an indication that one or both of the internal door 252-1 or the external door 252-2 is in a closed position or in a locked state is desired. Conversely, a feedback device 225 may be configured to emit light in a color of green, or to flash the light at various other intervals, when feedback in the form of form of an indication that one or both of the internal door 252-1 or the external door 252-2 are in an open position or in an unlocked state.

Alternatively, or in addition to lights, the feedback device 225 may be one or more components such as audio speakers or other physical components that may be automatically controlled or configured to generate audible messages, signals or sounds at frequencies, wavelengths or intensities that are selected to provide one or more indications to persons within the evaluation room 220, e.g., the customer 280. For example, a feedback device 225 may be configured to emit sounds including one or more musical notes, voices or spoken words, or other acoustic signals, when feedback in the form of an indication that one or both of the internal door 252-1 or the external door 252-2 is in a closed position or in a locked state is desired. Conversely, a feedback device 225 may be configured to emit sounds including one or more other musical notes, voices or spoken words, or other acoustic signals, when feedback in the form of an indication that one or both of the internal door 252-1 or the external door 252-2 is in a closed position or in a locked state is desired.

In some implementations, the feedback device 225 may also be one or more components such as haptic vibrating elements that may be automatically controlled or configured to generate tactile vibrations of any frequency or intensity, or components for generating any other type or form of feedback that may be sensed by persons within the evaluation room 220, e.g., the customer 280, such as tastes or smells.

The closet 250 may be any entirely or partially enclosed space provided in association with the evaluation room 220 that is configured or constructed to accommodate the transfer of one or more items into or out of the evaluation room 220, e.g., by way of the internal door 252-1 and/or the external door 252-2, to or from one or more inventory areas or other spaces. For example, the closet 250 may include an enclosure defined at least in part by a plurality of walls or other components, the internal door 252-1 and the external door 252-2. Items may be delivered to the evaluation room 220 via the closet 250 using the internal door 252-1 and the external door 252-2.

The internal door 252-1 or the external door 252-2 may be any door, portal or other system for enabling or restricting passage or access of persons or items between an enclosure defined by the closet 250 and an enclosure defined by the evaluation room 220. For example, the internal door 252-1 or the external door 252-2 may be or include a bifold door, a flush door, a hinged door, a pivoting door, a pocket door, a revolving door, a roller door, a sliding door, a swing door, or any other type or form of door. The internal door 252-1 or the external door 252-2 may include any form of access control system or locking system that enables either or both of the internal door 252-1 or the external door 252-2 to be placed in an open position or a closed system, or in a locked state or in an unlocked state, at any time upon receiving a passcode, a password, an identifier or a credential, or any other relevant information or data. Such access control systems or locking systems may be any devices or systems having access control functionality, or with which a user (e.g., the associate 240 or the customer 280) may interact to gain access to the closet 250 or the evaluation room 220, and may include hardware and software components. The access control systems or locking systems may thus operate based on one or more sets of information or data that may be applied or implemented at various times to cause the internal door 252-1 or the external door 252-2 to be placed in different positions or in different states. In some implementations, such as upon receiving a request from the associate 240 or the customer 280, e.g., from a mobile device, a keypad, or any other computer device or system, the internal door 252-1 or the external door 252-2 may be placed in an unlocked state, thereby enabling the internal door 252-1 or the external door 252-2 to be manually opened, or causing the internal door 252-1 or the external door 252-2 to be automatically opened.

The operation of the internal door 252-1 and the external door 252-2 may be interlocked, thereby permitting only one of the internal door 252-1 or the external door 252-2 to be operated at a given time, such as when the customer 280 is within the evaluation room 220.

In some implementations, the feedback device 225 may be provided in association with one or more aspects of the evaluation room 220, e.g., one or more walls, surfaces, or other features. In some implementations, the feedback device 225 may be provided in association with one or more aspects of the closet 250, e.g., either the internal door 252-1 or the external door 252-2.

In some implementations, the computer 222 may be a feedback device, and may show, display, play, emit, or otherwise generate feedback of any kind that may be viewed, heard or otherwise sensed or interpreted by persons within the evaluation room 220.

Moreover, the evaluation room 220 may further include one or more doors 228 that may be placed in an open position to enable access to the evaluation room 220 from a shopping area or other space within the materials handling facility 210, or to restrict access to the evaluation room 220 from the shopping area or other space within the materials handling facility 210. The doors 228 may include any number of the features described herein with respect to the internal door 252-1 or the external door 252-2.

Furthermore, the operation of the doors 228 may be interlocked in association with the operation of one or both of the internal door 252-1 or the external door 252-2. For example, when the doors 228 are placed in a closed position and in a locked state, either or both of the internal door 252-1 or the external door 252-2 may be placed in an open position and in an unlocked state, thereby enabling one or more associates 240 to deliver items into the evaluation room 220 by way of the replenishment closet 250. Once the items have been delivered to the evaluation room 250, and either or both of the internal door 252-1 or the external door 252-2 are in a closed position and in a locked state, the doors 228 may be placed in a locked state and enabled to be operated by any number of associates 240 or customers 280, as necessary.

The associate 240 may be any individual that is employed by, consults on behalf of or is otherwise associated with the materials handling facility 210 or the marketplace 270, such as a stylist or another worker. For example, in some implementations, the associate 240 may be provided to greet customers, e.g., the customer 280, upon an arrival at the materials handling facility 210, to receive or obtain information or data from the customer 280 regarding his or her interests or preferences, to retrieve one or more items from inventory, to prepare the evaluation room 220 for use by the customer 280, or to take any other actions in connection with operations of the materials handling facility 210 or the marketplace 270, or on behalf of the customer 280. The associate 240 may utilize one or more computers 242 (e.g., smartphones, tablet computers, laptop computers, desktop computers) that may operate one or more input/output devices 244 (e.g., interactive touchscreen displays, keyboards, keypads, microphones, mouses, speakers, styluses, or others) or transceivers 246, and include one or more processors or other components. The associate 240 may access or execute one or more software applications, such as a browser, a shopping application, or others, e.g., by the computer 242, and may be connected to or otherwise communicate with the materials handling facility 210 or the marketplace 270 through the network 290, by the transmission and receipt of digital data.

The marketplace 270 may be any entity or individual that wishes to make items from a variety of sources available for download, purchase, rent, lease or borrowing by customers (e.g., the customer 280) using a networked computer infrastructure, including one or more computer servers 272 and data stores (e.g., databases) 274 for hosting a network site (e.g., a web site). The network site may be implemented using the one or more servers 272, which connect or otherwise communicate with the one or more data stores 274 as well as the network 290, through the sending and receiving of digital data. The servers 272 may cause the display of information associated with the network site in any manner, e.g., by transmitting code such as Hypertext Markup Language (HTML) code over the network 290 to another computing device that may be configured to generate and render the information into one or more pages and to display such pages on a computer display of any kind. Moreover, the data stores 274 may include any type of information regarding items that have been made available for sale through the marketplace 270, or ordered by customers from the marketplace 270.

In addition to the servers 272 and/or the data stores 274, the marketplace 270 may further include any number of other components, including but not limited to one or more transceivers 276 that are configured to enable the marketplace 270 to communicate through one or more wired or wireless means, e.g., wired technologies such as USB or fiber optic cable, or standard wireless protocols such as Bluetooth® or any Wi-Fi protocol, such as over the network 290 or directly. Such transceivers 276 may share any number of attributes or features in common with the transceivers 216 of the materials handling facility 210, or may have any number of other attributes or features.

In some implementations, orders may be placed by customers via the marketplace 270 in any manner, including but not limited to online, by telephone, or in person, e.g., at a bricks-and-mortar facility, such as the materials handling facility 210.

The customer 280 may be any entities or individuals that wish to download, purchase, rent, lease, borrow or otherwise obtain items (e.g., goods, products, services or information of any type or form) from the materials handling facility 210 or the marketplace 270. The customer 280 may utilize one or more computers 282 (e.g., smartphones, tablet computers, laptop computers, desktop computers, as well as computer devices provided in automobiles, wristwatches, home appliances, televisions or any other machine) that may operate one or more input/output devices 284 (e.g., interactive touchscreen displays, keyboards, keypads, microphones, mouses, speakers, styluses, or others) or transceivers 286, and include one or more processors or other components. The customer 280 may access or execute one or more software applications, such as a browser, a shopping application, or others, and may be connected to or otherwise communicate with the materials handling facility 210 or the marketplace 270 through the network 290, by the transmission and receipt of digital data.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications ("GSM") network, a Code Division Multiple Access ("CDMA") network, a Long-Term Evolution ("LTE") network, a 5G network, or some other type of wireless network. Protocols and components for communicating via the Internet or any of the other aforementioned types of communication networks are well known to those skilled in the art of computer communications and thus, need not be described in more detail herein.

Although the system 200 of FIGS. 2A and 2B includes single boxes corresponding to the materials handling facility 210, the evaluation room 220, the associate 240, the closet 250, the marketplace 270, and the customer 280, those of ordinary skill in the pertinent arts will recognize that the system 200 may include any number or type of materials handling facilities 210, evaluation rooms 220, associates 240, closets 250, marketplaces 270 (or related facilities, e.g., fulfillment centers), or customers 280 in accordance with the present disclosure. Moreover, the associate 240 may operate within the materials handling facility 210 or remotely, e.g., in a different physical location than the materials handling facility 210, such as by operating the computer device 242 or any other systems connected to computer devices or systems of the materials handling facility 210, the evaluation room 220, the marketplace 270 or the customer 280 over the network 290. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein.

Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The materials handling facility 210, the evaluation room 220, the associate 240, the closet 250, the marketplace 270, or the customer 280 may use any web-enabled or Internet applications or features, or any other client-server applications or features (e.g., messaging techniques), to connect to the network 290, or to communicate with one another. For example, the materials handling facility 210, the evaluation room 220, the associate 240, the closet 250, the marketplace 270, and the customer 280 may be adapted to transmit information or data in the form of synchronous or asynchronous messages to one another or to any other computer device in real time or in near-real time, or in one or more offline processes, via the network 290. Those of ordinary skill in the pertinent art would recognize that materials handling facility 210, the evaluation room 220, the associate 240, the closet 250, the marketplace 270, and the customer 280 may operate, include or be associated with any of a number of computing devices that are capable of communicating over the network 290, and that the protocols and components for providing communication between such devices are well known to those skilled in the art of computer communications and need not be described in more detail herein.

Those of ordinary skill in the pertinent arts will understand that process steps described herein as being performed by a "materials handling facility," an "evaluation room" (or a "fitting room"), an "associate," a "closet," a "marketplace," or a "customer," or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," an "evaluation room" (or a "fitting room"), an "associate," a "closet," a "marketplace," or a "customer," or like terms, may be typically performed by a human, but could, alternatively, be performed by an automated agent. The protocols and components for providing communication between the materials handling facility 210, the evaluation room 220, the associate 240, the closet 250, the marketplace 270 and/or the customer 280 are well known to those skilled in the art of computer communications and need not be described in more detail herein.

The data and/or computer executable instructions, programs, firmware, software and the like (also referred to herein as "computer-executable" components) described herein may be stored on a computer-readable medium that is within or accessible by computers or computer components such as the server 212, the data store 214, the computer 222, the computer 242, the server 272, the data store 274, or the computer 282, or any other computers or control systems utilized by the materials handling facility 210, the evaluation room 220, the associate 240, the marketplace 270, or the customer 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections. Moreover, any of the applications or functions described herein as being performed by one or more of the server 212, the computer 222, the computer 242, the server 272 or the computer 282 may be performed by any of the server 212, the computer 222, the computer 242, the server 272 or the computer 282, or any other computer devices or systems maintained or operated by the materials handling facility 210, the evaluation room 220, the associate 240, the marketplace 270 or the customer 280 in accordance with the present disclosure.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
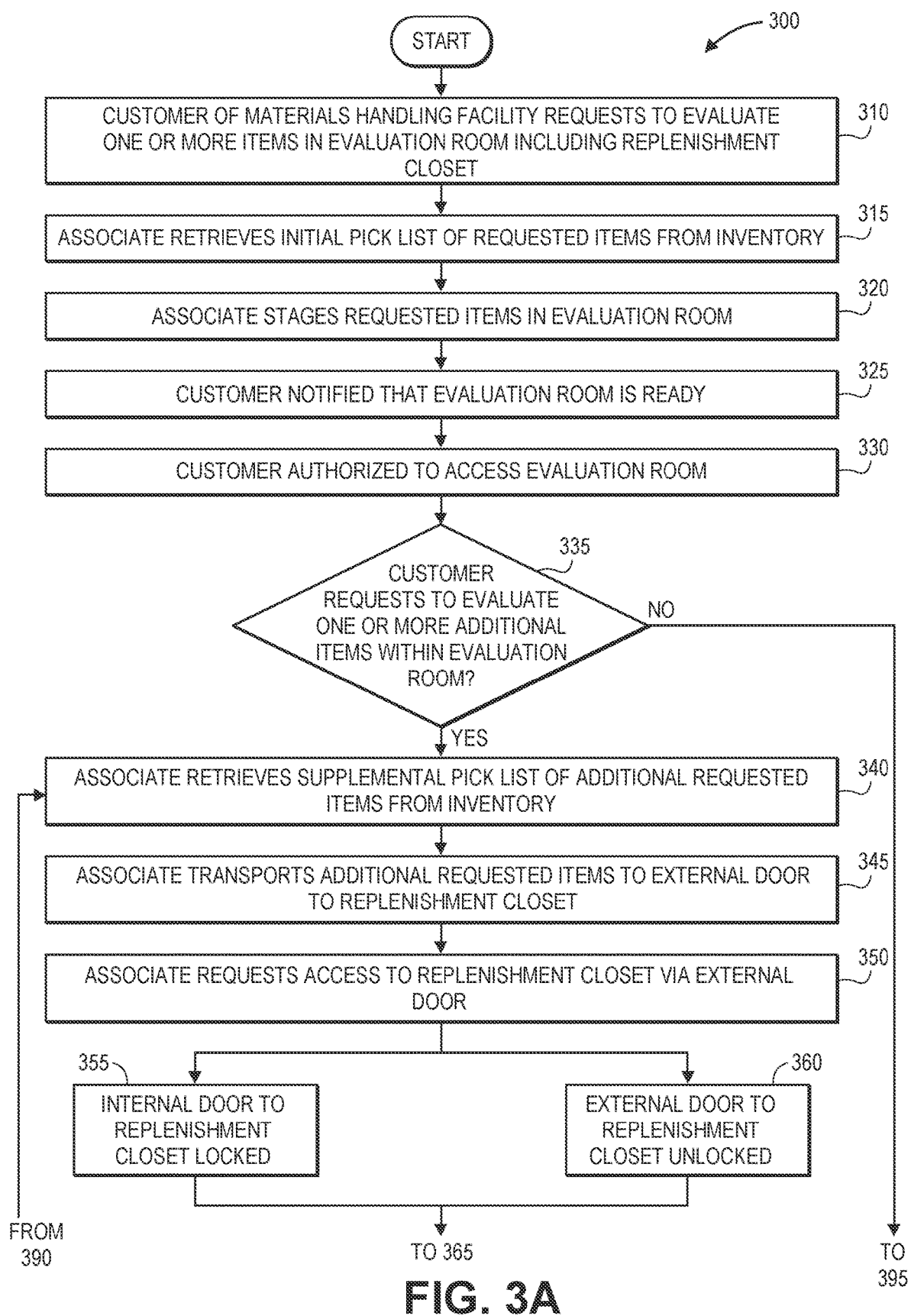
FIGS. 3A and 3B are a flow chart of one process for delivering items to evaluation rooms in accordance with implementations of the present disclosure.
Figure 3B:
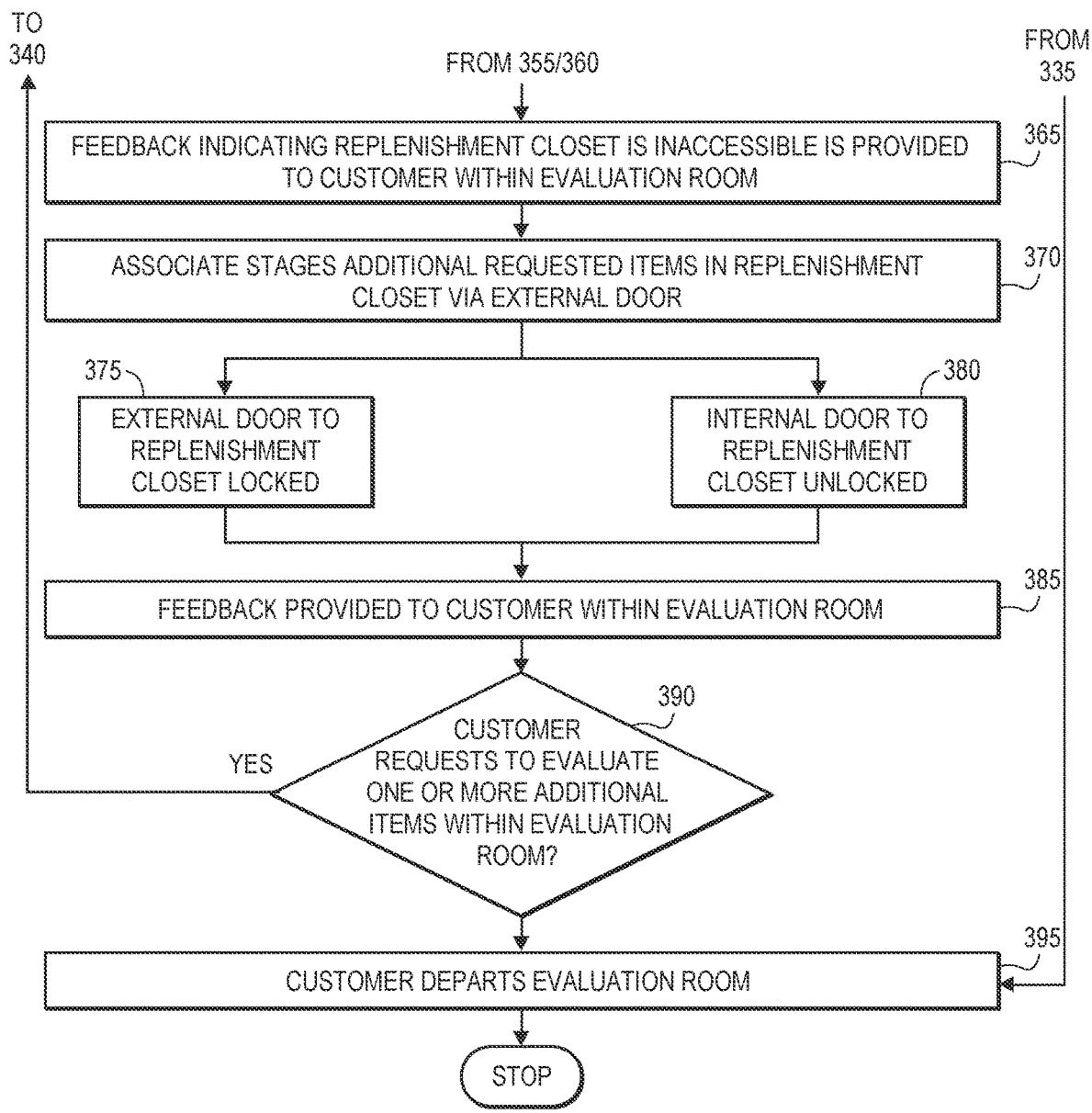

Referring to FIGS. 3A and 3B, a flow chart 300 of one method for delivering items in accordance with implementations of the present disclosure is shown. At box 310, a customer of a materials handling facility requests to evaluate one or more items in an evaluation room (e.g., a fitting room) including a replenishment closet of the present disclosure.

The customer may request to evaluate an item in inventory at the materials handling facility in any manner. For example, the customer may locate and manually retrieve or acquire the item from a bar, a bin, a cubby, a hook, a rack, a table, a shelf or another inventory area at the materials handling facility. Alternatively, the customer may select the item electronically, e.g., by entering or selecting one or more identifiers of the item, using one or more user interfaces rendered by a mobile device of the customer, or by any other computer device or system, either prior to or after arriving at the materials handling facility. The customer may further scan a bar code or other identifier provided on a tag or other feature of the item, or capture one or more images of the item, using a mobile device or another computer device or system, and the item may be identified as having been selected by the customer upon interpreting the bar code or other identifier, or detecting the item as being depicted within the one or more images. Alternatively, the one or more items may be selected on behalf of the customer, such as by a companion to the customer at the materials handling facility, by a human stylist, an associate, or another worker at the materials handling facility, or by an automated system, e.g., a machine learning algorithm, model, system or technique that is trained to identify items for the customer based on one or more attributes of the customer, one or more attributes of items that have already been selected by the customer, or that are known or believed to be owned or worn by the customer, or information or data regarding any trends or interests of the customer or similarly situated customers, as well as one or more attributes of the selected items in inventory at the materials handling facility.

At box 315, an associate retrieves an initial pick list of the requested items from inventory. For example, a list of items requested by or on behalf of the customer may be printed on paper, or presented to an associate on a display of a mobile device or any other computer system, and an associate may utilize the list to pick the requested items from one or more inventory areas of the materials handling facility, such as any number of bars, bins, cubbies, hooks, racks, tables or shelves. The inventory areas from which the requested items are retrieved may be visible or accessible to the customer, e.g., in a shopping area of the materials handling facility, or obscured or inaccessible to the customer, e.g., in a back room or other area or space of the materials handling facility.

The list of items may also include, for example, any other items identified on behalf of the customer, such as by a human stylist or automated system of the materials handling facility. For example, in some implementations, the list of items may include any number of complements to items requested by the customer, e.g., items that may be used or worn together with one or more of the items requested by the customer, such as a hat to complement a shirt, a pair of socks to complement a pair of shoes, or a belt or to complement a pair of pants that have been identified for the customer by a human stylist or an automated system. In some implementations, the list of items may also include any number of substitutes for items requested by the customer, e.g., a belt, a hat, a pair of pants, a pair of shoes, a pair of socks or a shirt to be evaluated along with another belt, hat, pair of pants, pair of shoes, pair of socks or shirt requested by the customer. The list of items may further include any number of replacements for items that are known or believed to be owned or worn by the customer, e.g., other belts, hats, pants, shoes, shirts or socks, which may be identified or determined from any source or on any basis, such as a purchasing history of the customer at an electronic marketplace.

Alternatively, the requested items may be retrieved from inventory by one or more machines, e.g., an autonomous mobile robot, which may be programmed with identifiers of the items and their respective locations within inventory areas at the materials handling facility, and instructions to retrieve such items.

At box 320, the associate stages the requested items in the evaluation room, which may have been selected by or on behalf the customer on any basis. The items may be placed, hung or otherwise deposited by the associate on any surfaces or features within the evaluation room, such as bars, cabinets, chairs, hooks, shelves, or others. In some implementations, the items may be transported to the evaluation room for staging in any manner, e.g., manually or by a mobile system, such as a cart, a basket, or another system. Moreover, in some implementations, the items may be staged in the evaluation room by way of a door to the evaluation room, or by passing through the replenishment closet.

In some implementations, the customer may specify a type of evaluation room, or a specific evaluation room, that he or she desires. For example, in some implementations, the customer may indicate that he or she is a person having a disability, or shopping with a small child, or otherwise requires an evaluation room that is sufficiently sized or configured to accommodate persons having disabilities or a customer and a child. Alternatively, a type of evaluation room, or a specific evaluation room, may be selected for the customer based on the items to be staged therein, e.g., a most appropriate evaluation room for trying on the number of items to be staged therein, or items of the size or type to be staged therein. In some implementations, the customer may indicate that he or she does not require any specific evaluation room, or any type of evaluation room, in order to evaluate the items to be staged therein. For example, the customer may indicate that he or she would accept a "first available" evaluation room, or an evaluation room that is available at a specific time.

The items staged in the evaluation room at box 320 may include items requested by the customer, or identified for or on behalf of the customer, e.g., as complements, substitutes, or replacements, or for any other reason or on any other basis.

In some implementations, prior to the staging of the requested items or any other items in the evaluation room, the customer may be informed that he or she has been assigned to the evaluation room, e.g., by one or more electronic messages or other signals identifying a number or a location of the evaluation room within the materials handling facility. The messages or signals may be SMS or MMS text messages, social network messages, electronic mail messages, or messages transmitted to or from a dedicated application operating on a mobile device or other system of the customer, or any other messages or signals. Alternatively, or additionally, the customer may be informed in person that the evaluation room has been assigned to him or her by an associate at the materials handling facility, by a sign or by one or more telephone calls or other audible signals, or in any other manner. The customer may accept the assignment of the evaluation room, decline to accept the assignment, delay an acceptance of the assignment, or take any other action in response to the assignment, e.g., by one or more gestures or other interactions with a user interface displayed by a mobile device or other computer system, or in any other manner, such as by one or more transmitting SMS or MMS text messages, social network messages, electronic mail messages, or other messages to a server or another computer device or system associated with the materials handling facility.

At box 325, the customer is notified that the evaluation room is ready. For example, one or more electronic messages or other signals may be transmitted to a computer device or system of the customer, or a computer device or system provided on a wall or other surface at the materials handling facility. Alternatively, the customer may be notified in any other manner, e.g., visually or audibly.

At box 330, the customer is authorized to access the evaluation room. For example, in some implementations, one or more electronic messages or signals identifying the customer or a computer device or system of the customer may be transmitted to an access control system (e.g., a smart lock), which may be configured to permit the customer to access the evaluation room via a door between an interior of the evaluation room and a shopping area or other space associated with the materials handling facility upon one or more gestures or other interactions with the computer device or system of the customer.

Within the evaluation room, the customer may try on one or more of the requested items, and remove clothes that he or she is wearing, as necessary, in the privacy of an enclosed or substantially enclosed space. For example, the customer may request to evaluate any number of additional items, by one or more gestures or other interactions with a computer device or system provided within the evaluation room, e.g., mounted on a wall or other surface or component of the evaluation room. In some implementations, the computer device or system may display information regarding additional items on a user interface, such as images, videos, text or other information or data regarding the additional items, and the customer may browse such information or data before requesting to evaluate, or declining to request to evaluate, any of the additional items represented in the user interface. A customer may make specific or general requests to evaluate additional items by selections on an interactive display of a computer device or system, voice commands captured by microphones or other acoustic sensors provided within the evaluation room, e.g., "bring me a pair of these jeans in size large," or "I could use some shoes to go with this top," or in any other manner.

Information or data displayed on a computer device or system within the evaluation room may include, but need not be limited to, information or data identifying or referencing the customer, or the items staged therein, as well as any sales or promotions at the materials handling facility or other stores or establishments, any prevailing weather conditions, recent sports scores or schedules, current events, topics of interest, or any other information or data, such as images, text, multimedia or others. Alternatively, or additionally, the computer device or system may also be configured to play sounds or other audio data, such as songs, or to provide audible messages of any type or form to the customer.

At box 335, whether the customer has requested to evaluate any additional items within the evaluation room is determined. For example, if the customer has not requested any additional items by interactions with an interactive display or by any voice commands within the evaluation room, then the process advances to box 395, where the customer departs the evaluation room, and the process ends. Upon departing the evaluation room, a customer may typically elect to purchase one or more of the items that he or she evaluated within the evaluation room or others, or decline to purchase any items, and any items within the evaluation room may be returned to stock, either by the customer or by one or more associates or other personnel at the materials handling facility.

If the customer has requested to evaluate one or more additional items within the evaluation room, however, then the process advances to box 340, where an associate retrieves a supplemental pick list of the additional requested items from inventory. The supplemental pick list may be generated in a manner similar to that by which the initial pick list was generated at box 315, and may include not only additional items requested by the customer but any other items, such as complements, substitutes, or replacements of the additional items that may be identified for any other reason or on any basis, e.g., by a human stylist or an automated system.

At box 345, the associate transports the additional requested items to an external door to the replenishment closet, e.g., manually or by a mobile system, such as a cart, a basket, or another system. The external door may be a barrier between the replenishment closet and one or more inventory areas or other spaces at the materials handling facility, and may be unlocked and opened to enable access to the replenishment closet from such inventory areas or spaces, or locked and opened to inhibit access to the replenishment closet from such inventory areas or spaces.

At box 350, the associate requests access to the replenishment closet via the external door. In some implementations, the associate may request access by an access control system of the external door that includes a keypad or another feature for entering a passcode, a password, an identifier or a credential thereon in order to obtain access. Alternatively, the associate may request access using an application operating on a mobile device or other computer system, and the mobile device or other computer system may transmit a passcode, a password, an identifier or a credential to an access control system of the external door. The associate may request access and be authorized or authenticated by an access control system of the external door, or any other systems or methods, in any manner.

At box 355, an internal door to the replenishment closet is locked. The internal door may be a barrier between the replenishment closet and the evaluation room, and may be unlocked and opened to enable access to the replenishment closet from such inventory areas or spaces, or locked and closed to inhibit access to the replenishment closet from such inventory areas or spaces. Thus, upon authorizing or authenticating the associate, locking the internal door prevents the customer within the evaluation room from accessing the replenishment closet.

In parallel, at box 360, the external door to the replenishment closet is unlocked. Upon authorizing or authenticating the associate, access to the replenishment closet from outside the evaluation room by the associate is enabled. Because the internal door to the replenishment closet is locked at box 355, however, the customer may not access the replenishment closet while the associate has access to the replenishment closet. Likewise, the associate may not access the evaluation room by way of the replenishment closet.

At box 365, feedback is provided to the customer within the evaluation room, indicating that the replenishment closet is inaccessible. For example, when the internal door to the replenishment closet is locked, and the external door to the replenishment closet is locked, audible or visual feedback is provided to the customer, indicating that the associate is staging items within the replenishment closet, or that the customer may not access the replenishment closet. In some implementations, providing the feedback may include illuminating a light provided in association with the internal door, displaying one or more electronic messages on an interactive display within the evaluation room, or otherwise generating a visual indicator that the replenishment closet may not be accessed, or that items are being staged therein. A light illuminated to provide feedback may have a red or other color implying that the internal door is locked or that access to the replenishment closet is otherwise restricted. A message displayed on an interactive display may expressly indicate, by images, text or other indicia, that the internal door is locked, that items are being staged within the replenishment closet, or that access to the replenishment closet is otherwise restricted.

At box 370, the associate stages the additional requested items in the replenishment closet via the external door. The additional requested items may be staged in the replenishment closet in any manner, e.g., by hand or using one or more machines or systems.

In some implementations, the associate or machine that retrieved the initial pick list of requested items at box 315 may be the same associate that stages the requested items from the initial pick list in the evaluation room at box 320, retrieves the supplemental pick list of additional requested items at box 340, transports the additional requested items to the external door at box 345, requests access to the replenishment closet by way of the external door at box 350, or stages the additional requested items in the replenishment closet via the external door at box 370. Alternatively, in some implementations, two or more associates or machines may perform any of the actions or functions associated with the process steps of box 315, box 320, box 340, box 345, box 350 or box 370. Such associates or machines may be selected on any basis, including but not limited to familiarity with any of the requested items, or to optimize the staging of items within the evaluation room or any other evaluation rooms, e.g., according to one or more shortest paths or in any other manner.

At box 375, after the additional requested items have been staged in the replenishment closet at box 370, the external door to the replenishment closet is locked, thereby preventing the associate or any other associates or other personnel from accessing the replenishment closet or the evaluation room by way of the external door.

In parallel, or after the external door has been locked, at box 380, the internal door to the replenishment closet is unlocked, thereby enabling the customer to access the replenishment closet. Because the external door is locked at box 375, however, the customer may not depart from the evaluation room or otherwise enter any inventory areas or other spaces at the materials handling facility to which the customer is not permitted to enter by way of the replenishment closet.

At box 385, feedback is provided to the customer within the evaluation room, indicating that the replenishment closet is accessible, or that the additional items requested by the customer are staged within the replenishment closet. For example, when the external door to the replenishment closet is locked, and the internal door to the replenishment closet is locked, audible or visual feedback is provided to the customer, indicating that the customer may access the replenishment closet, or that the additionally requested items have been staged therein. In some implementations, providing the feedback may include illuminating a light provided in association with the internal door or any other features within the evaluation room, displaying one or more electronic messages on an interactive display within the evaluation room, or otherwise generating a visual indicator that items have been staged within the replenishment closet or that the replenishment closet is now accessible to the customer by way of the internal door. A light illuminated to provide feedback may have a white or other color implying that the internal door is unlocked or that access to the replenishment closet is otherwise enabled. A message displayed on an interactive display may expressly indicate, by images, text or other indicia, that the internal door is unlocked, that items have been staged within the replenishment closet, or that access to the replenishment closet is otherwise enabled.

The associate may then access the replenishment closet to evaluate any of the additional requested items staged therein, or decline to evaluate any of such items. For example, within the evaluation room, the customer may try on one or more of the additional requested items, and remove clothes that he or she is wearing. The customer may also request to evaluate any number of additional items, by one or more gestures or other interactions with a computer device or system provided within the evaluation room, or in any other manner.

At box 390, whether the customer has requested to evaluate any additional items within the evaluation room is determined. If the customer has requested to evaluate one or more additional items within the evaluation room, then the process returns to box 340, where an associate retrieves a supplemental pick list of the additional requested items from inventory.

If the customer has not requested to evaluate any additional items within the evaluation room, however, then the process advances to box 395, where the customer departs the evaluation room, and the process ends. Upon departing an evaluation room, a customer may typically elect to purchase one or more of the items, and any remaining items may be returned to stock, either by the customer or by one or more associates or other personnel at the materials handling facility.

Figure 4A:
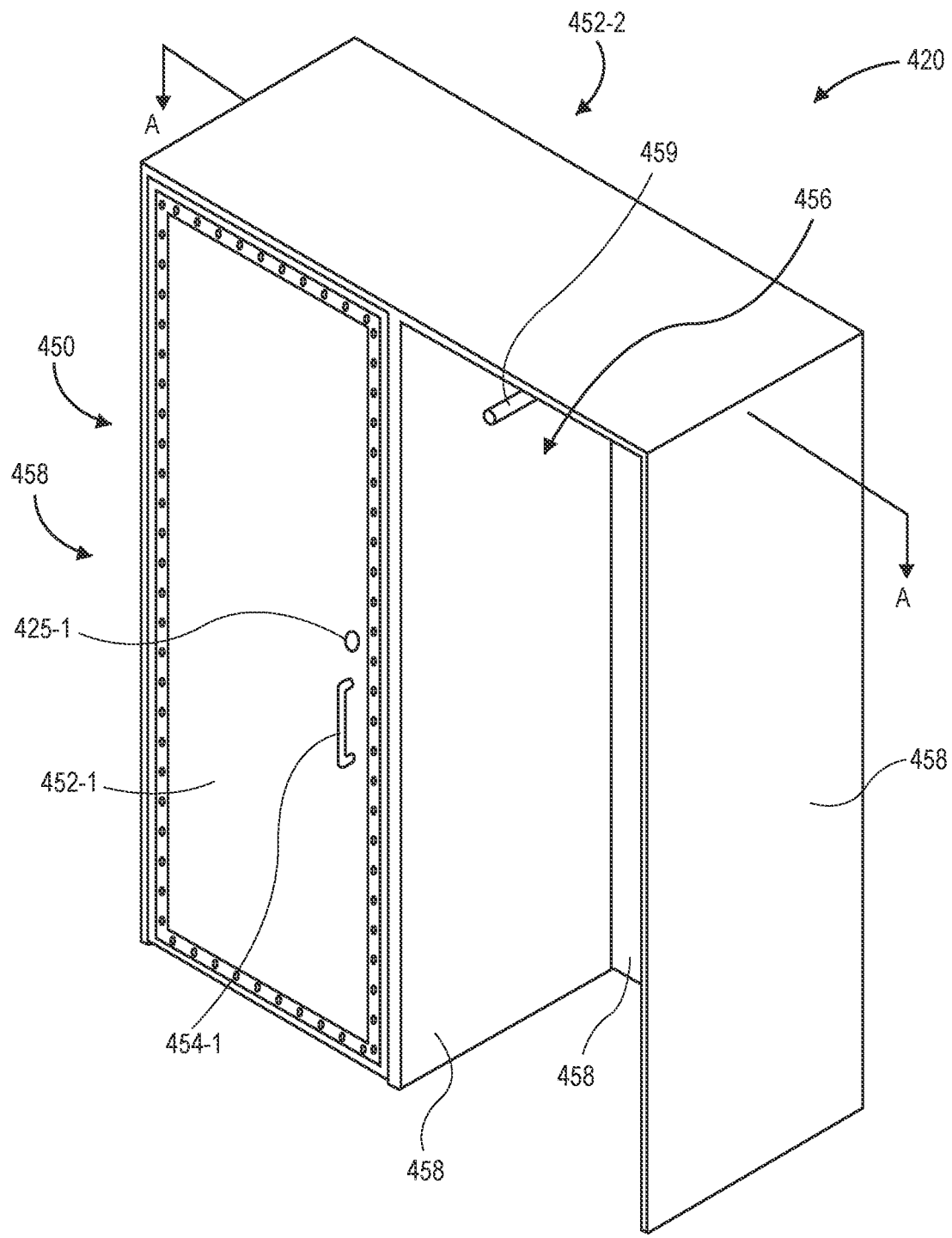
FIGS. 4A through 4C are views of aspects of one system for delivering items to evaluation rooms in accordance with implementations of the present disclosure.
Figure 4B:
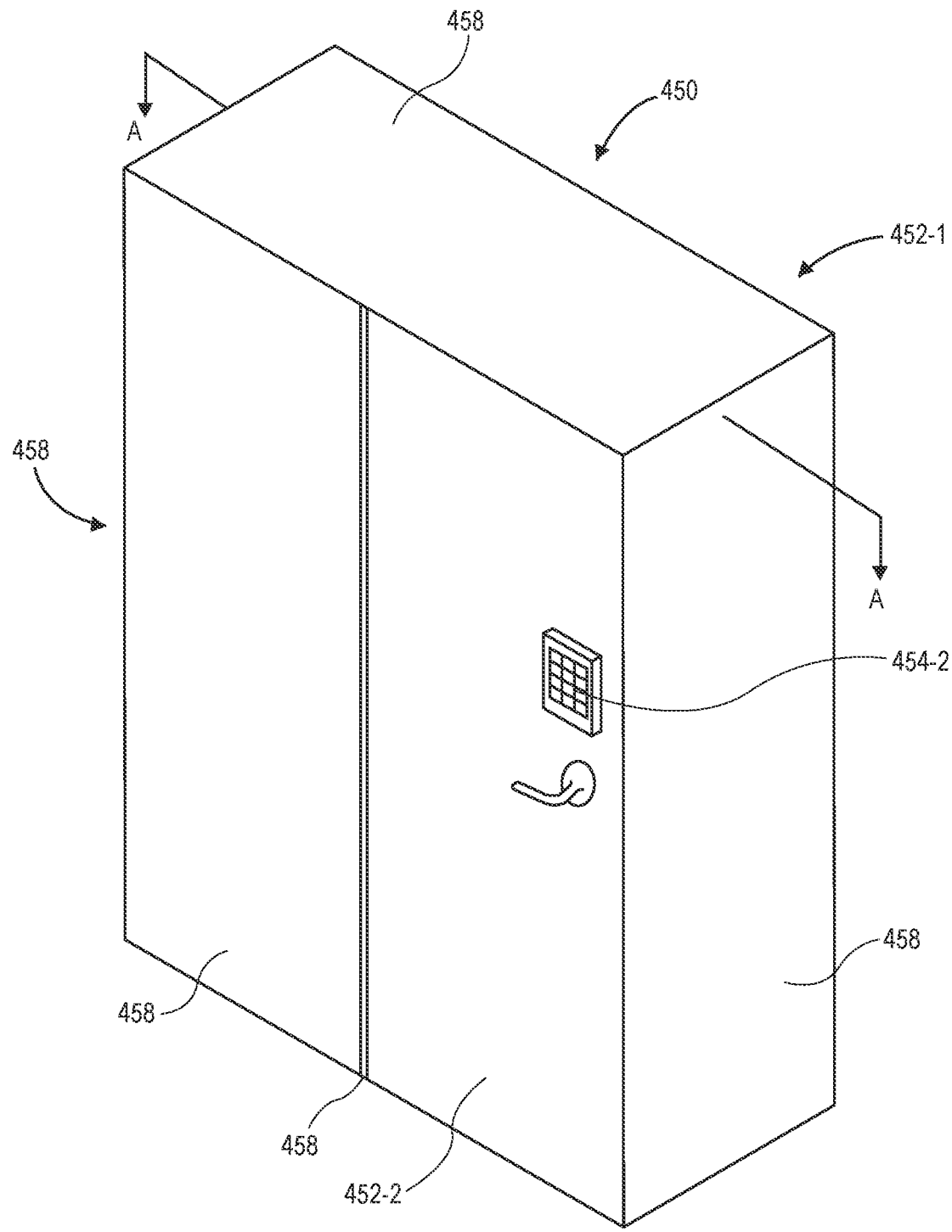
Figure 4C:
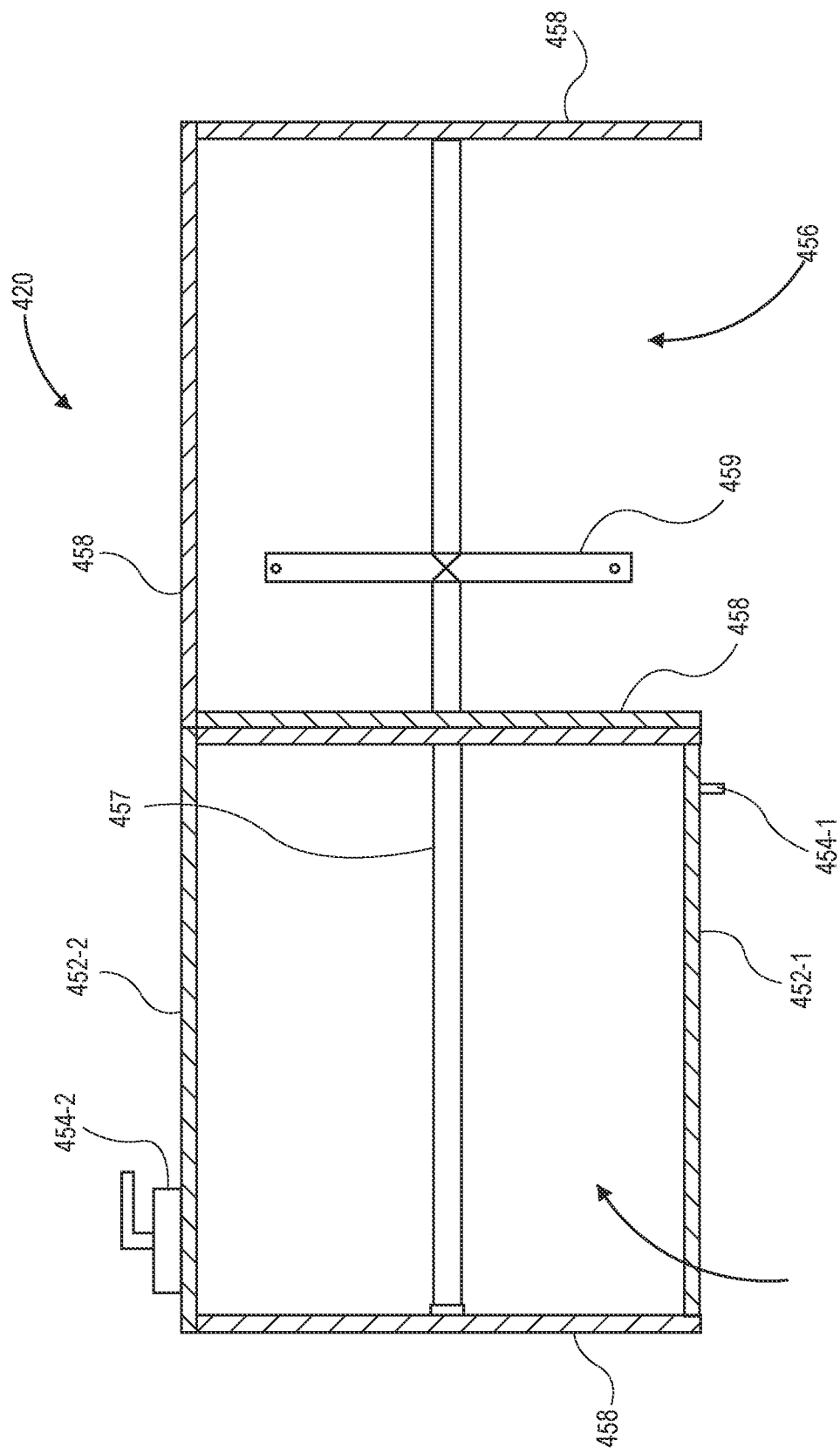

Referring to FIGS. 4A through 4C, views of aspects of one system for delivering items to evaluation rooms in accordance with implementations of the present disclosure are shown. Except where otherwise noted, reference numerals preceded by the number "4" shown in FIGS. 4A through 4C indicate components or features that are similar to components or features having reference numerals preceded by the number "2" shown in FIG. 2A or 2B and by the number "1" shown in FIGS. 1A through 1U.

FIG. 4A is a front perspective view of one replenishment closet 450 in accordance with implementations of the present disclosure. FIG. 4B is a rear perspective view of the replenishment closet 450. FIG. 4C is a cross-sectional view of the replenishment closet 450 taken along section lines A-A in FIG. 4A or 4B.

As is shown in FIGS. 4A through 4C, the replenishment closet 450 is a portion of an evaluation room 420. The replenishment closet 450 includes an enclosure defined at least in part by an internal door 452-1, an external door 452-2, and a plurality of panels 458, e.g., vertically aligned walls and/or a horizontal cover. The internal door 452-1, the external door 452-2 and the panels 458 may be aligned in a vertical or substantially vertical alignment and joined at right angles, or at any other angles, to define the enclosure. The replenishment closet 450 may be sized or shaped as necessary to define a suitably large enclosure for accommodating any number of items therein.

The evaluation room 420 further includes an open-front locker (or cabinet) 456 provided adjacent to the replenishment closet 450. The locker 456 is also formed from a plurality of the panels 458 and includes a partial enclosure defined on three sides. The replenishment closet 450 and the locker 456 further include a hanger bar 459 extending laterally therethrough.

As is also shown in FIGS. 4A and 4B, the replenishment closet 450 and the locker 456 include a ceiling or an upper barrier provided above an enclosure, and a floor or a lower barrier provided below the enclosure. Alternatively, in some implementations, the replenishment closet 450 or the locker 456 may be constructed atop a floor of the evaluation room 420 or a materials handling facility, and beneath a ceiling of the evaluation room 420 or the materials handling facility. In some embodiments, neither the locker 456 nor the replenishment closet 450 need not include its own floor or ceiling.

The replenishment closet 450 and the locker 456 may have any dimensions. In some implementations, the external door 452-2, the internal door 452-1 or the panels 458 may have thicknesses of approximately three-quarters of one inch to one inch (¾" to 1"). In some other implementations, the enclosures defined by the replenishment closet 450 and the locker 456 may have interior widths of approximately twenty-four inches to thirty inches (24" to 30"), and interior depths of approximately twenty inches to thirty inches (20" to 30").

As is discussed above, the external door 452-2 and the internal door 452-1 may feature access control systems (e.g., locks) or interlocks that restrict the operation of the respective doors 452-1, 452-2, such that only one of the external door 452-2 or the internal door 452-1 may be operated by an associate or a customer, respectively, or open at a given time. For example, in some implementations, the internal door 452-1 may be ordinarily or initially in an unlocked state, and the external door 452-2 may be ordinarily or initially in a locked state, such that a customer may access the replenishment closet 450 from within the evaluation room 420, but an associate outside of the evaluation room 420 may not access the replenishment closet 450. The external door 452-2 may be maintained in a closed position, and in the locked state, by one or more electromechanical systems, e.g., smart locks. Such systems may generate an electromagnetic field that draws plates or other metallic components of the external door 452-2 into contact with a frame or other portions of the replenishment closet 450, e.g., one of the panels 458. Alternatively, the external door 452-2 may be maintained in the locked state by one or more deadbolts or like systems that extend from the external door 452-2 radially outward into a frame or another portion of the replenishment closet 450 in order to restrict movement of the external door 452-2 from the closed state. Alternatively, the external door 452-2 may be maintained in the locked state in any other manner.

An associate may request to access the replenishment closet 450 from outside of the evaluation room 420, e.g., from an inventory area or other space from which items may be retrieved and delivered to the evaluation room 420 by way of the replenishment closet 450. In some implementations, the associate may provide a passcode, a password, an identifier or a credential to an access control system associated with the external door 452-2, or indicate an intent to enter the replenishment closet 450 via one or more applications operating on a mobile device or another computer system, or otherwise request to access the replenishment closet 450 in any other manner. Upon receiving the request, a position of the internal door 452-1 may be determined. When the internal door 452-1 is in a closed position, the internal door 452-1 may be placed in a locked state, e.g., by one or more electromechanical systems, e.g., smart locks. Once the internal door 452-1 is in the closed position and in the locked state, the external door 452-2 may be placed in an unlocked state, thereby enabling the associate to access the replenishment closet 450 via the external door 452-2, e.g., to stage one or more items in the replenishment closet 450.

In some implementations, the evaluation room 420 may be accessed by way of the external door 452-2 and the internal door 452-1 for any purpose. For example, when a door between an interior of the evaluation room 420 and a shopping area of a materials handling facility in which the evaluation room 420 is provided is in a closed position and in a locked state, an associate may enter the evaluation room 420 via the replenishment closet 450 to stage an initial set of items requested by or on behalf of the customer in the evaluation room 420, e.g., in the locker 456. Once the initial set of items has been staged in the evaluation room 420, the associate may depart the evaluation room 420 via the replenishment closet 450, and the external door 452-2 to the replenishment closet 450 may be placed in a closed position and in a locked state. Thus, the replenishment closet 450 enables an associate to avoid interacting with customers when staging items or performing any other tasks in the evaluation room 420.

Although the replenishment closet 450 of FIGS. 4A through 4C has a substantially rectangular cross-section, replenishment closets of the present disclosure may have any shape or size, and may be formed from any number of internal doors 452-1, external doors 452-2 or panels 458, and need not be rectangular.

Components of the replenishment closet 450 may be formed from any suitable materials in accordance with implementations of the present disclosure. In some implementations, all or portions of the internal door 452-1, the external door 452-2 or the panels 458 may be formed from woods (e.g., birch, plywood, or others), drywall, metals (e.g., steel, aluminum, or others), plastics, composites, or any other materials of any strength or durability. In some implementations, surfaces of the internal door 452-1, the external door 452-2 or the panels 458 may be covered with any suitable coverings, including but not limited to woods, metals, plastics or composites of any thickness, as well as curtains, drapes, paints, photographs or other substances or materials.

As is discussed above, evaluation rooms that include replenishment closets of the present disclosure may be outfitted with one or more feedback devices that may inform a customer, e.g., visually, audibly or otherwise, as to the status of a replenishment closet, and whether the customer may access the replenishment closet to retrieve any items staged therein by associates or other personnel. Referring to FIGS. 5A through 5D, views of aspects of one system for delivering items to evaluation rooms in accordance with implementations of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4C, by the number "2" shown in FIG. 2A or 2B and by the number "1" shown in FIGS. 1A through 1U.

FIGS. 5A through 5D include top views of an evaluation room (e.g., a fitting room) 520 including a replenishment closet of the present disclosure. The evaluation room 520 includes an enclosure defined by a door 528 and a plurality of walls, as well as a computer system 522 (e.g., a tablet computer) and a mirror 523 mounted to at least one of the walls within the evaluation room 520. The replenishment closet 550 also includes an enclosure defined by a plurality of walls, as well as an internal door (or first door) 552-1 and an external door (or second door) 552-2. The internal door 552-1 is provided between the enclosure of the evaluation room 520 and the enclosure of the replenishment closet 550. The external door 552-2 is provided between the enclosure of the replenishment closet 550 and an exterior of the evaluation room 520 or the replenishment closet 550, which may include or be associated with an inventory area.

The evaluation room 520 includes a plurality of feedback devices 525-1, 525-2, 525-3 that may provide visual feedback to persons in the evaluation room 520. The feedback device 525-1 is a visible, colored light that may be illuminated in one or more selected colors (e.g., red) when the interior door 552-1 is in a locked state, thereby indicating that access to the replenishment closet 550 from within the evaluation room 520 is restricted, for any reason. The feedback device 525-2 is a light, or a strip or other collection of lights, provided around at least a portion of a perimeter of a side of the internal door 552-1 that faces the enclosure of the evaluation room 520, or in any other location, that may illuminate when items are determined to be within the replenishment closet 550, when the interior door 552-1 is in an unlocked state, or when access to the replenishment closet 550 from within the enclosure of the evaluation room 520 is otherwise enabled, or for any other reason. Similarly, the feedback device 525-3 may also be a light, or a strip or other collection of lights, provided around at least a portion of a perimeter of the mirror 523 that may also illuminate when items are determined to be within the replenishment closet 550, when the interior door 552-1 is in an unlocked state, or when access to the replenishment closet 550 from within the enclosure of the evaluation room 520 is otherwise enabled, or for any other reason.

Additionally, the computer system 522 may also be configured to provide feedback to persons within the evaluation room 520, e.g., visual feedback in the form of information or data rendered by a touchscreen display 524, audible feedback in the form of sounds or words played by one or more speakers, or any other type or form of feedback.

Figure 5A:
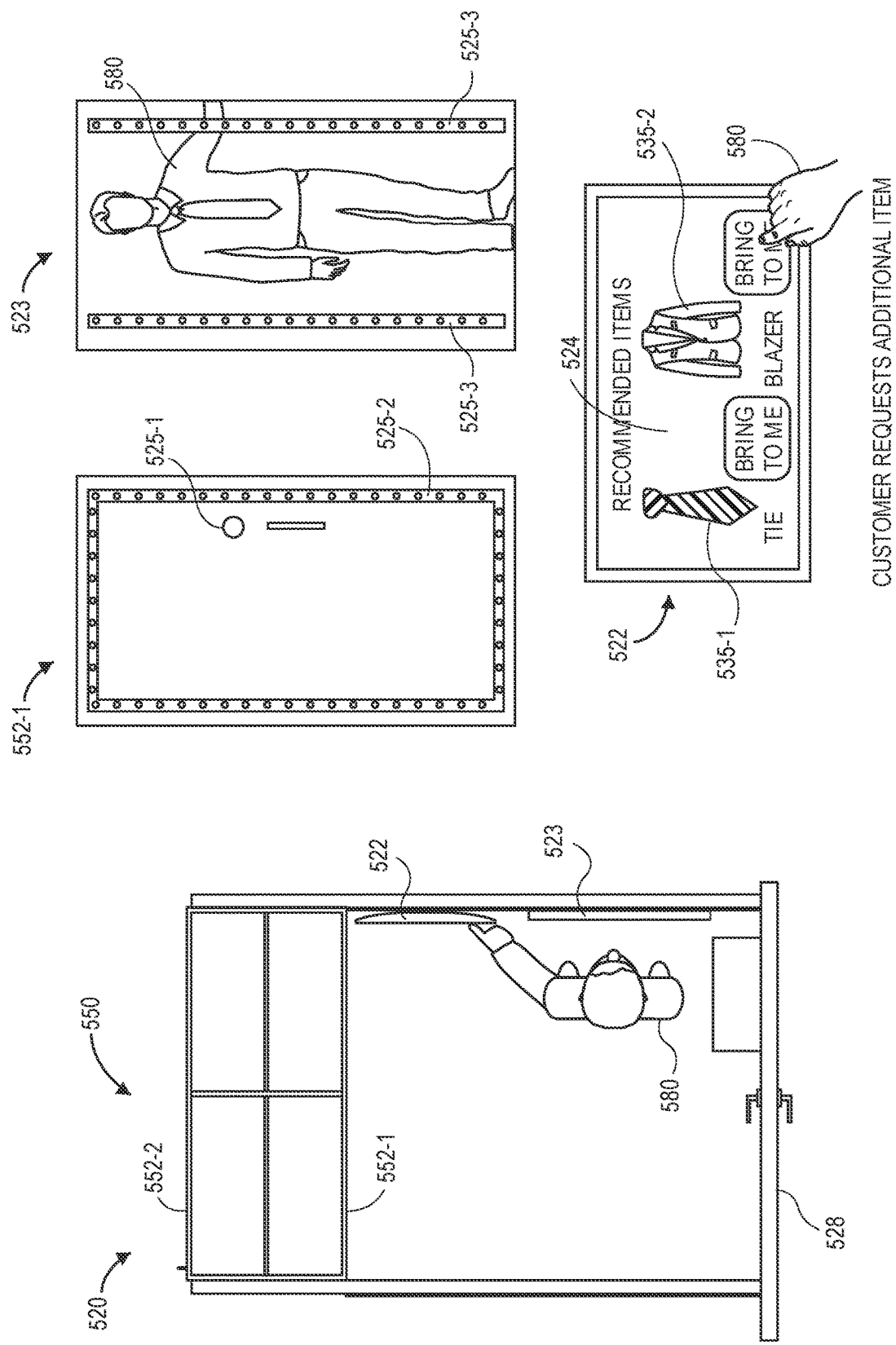

As is shown in FIG. 5A, a customer 580 is within the evaluation room 520, and each of the door 528, the internal door 552-1 and the external door 552-2 are in closed positions. Information or data regarding an item 535-1, e.g., a tie, and an item 535-2, e.g., a blazer or another jacket or coat, is shown on the touchscreen display 524.

The customer 580 stands in front of the mirror 523 and requests that the item 535-2 be delivered to the evaluation room 520 for his or her review. The customer 580 may make the request by contact with one or more buttons or other interactive features on the touchscreen display 524, as shown in FIG. 5A, or in any other manner, such as by uttering one or more voice commands, or in any other manner. Because the replenishment closet 550 is accessible to the customer 580, and no additional items are located therein, neither the feedback devices 525-1, 525-2, 525-3 nor the computer system 522 is providing any feedback to the customer 580 within the evaluation room 520.

Figure 5B:
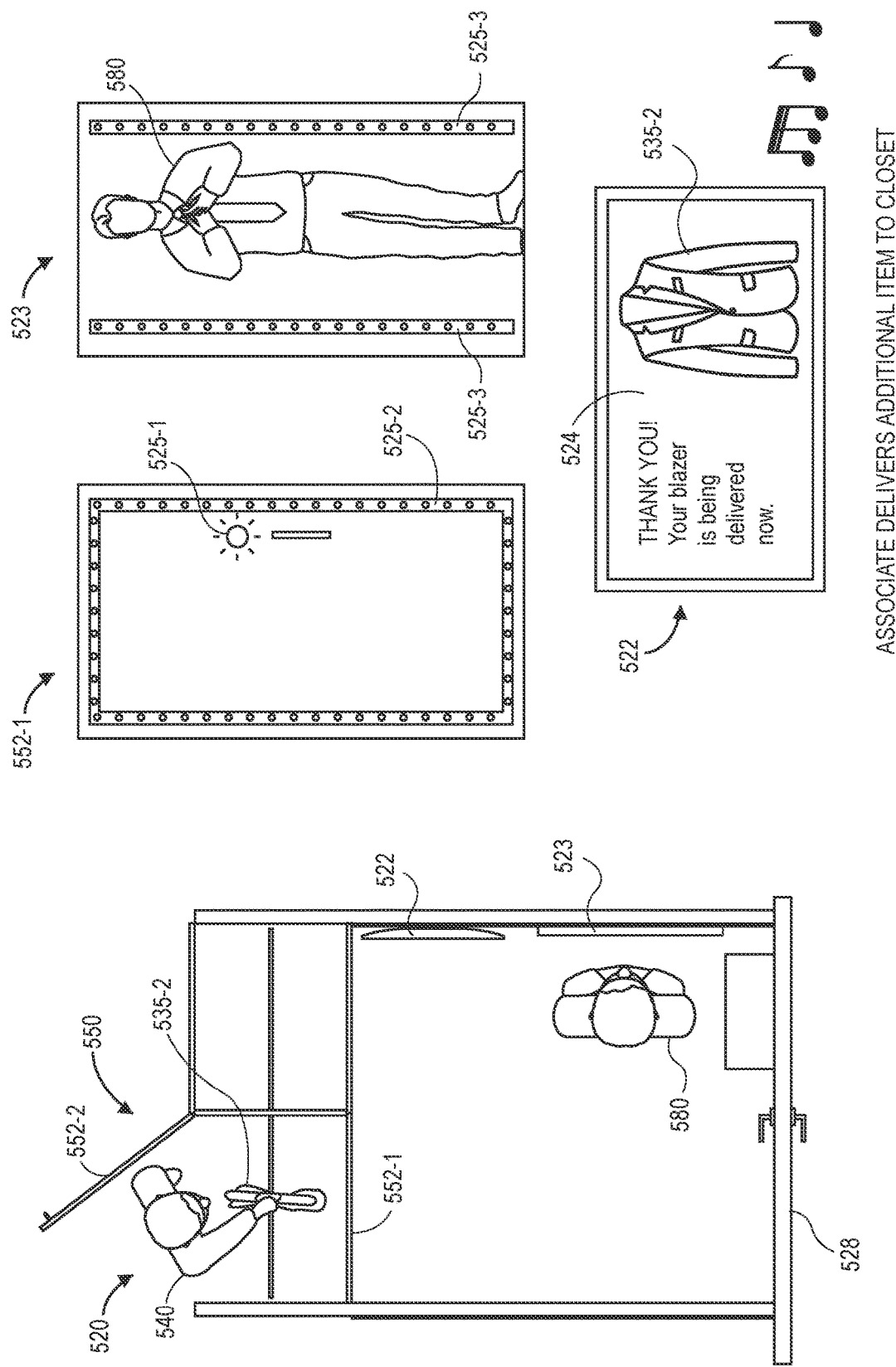

As is shown in FIG. 5B, an associate 540 is shown staging the item 535-2 in the replenishment closet 550 by way of the external door 552-2. The internal door 552-1 and the door 528 are in closed positions, and may be in locked states, to ensure that the privacy of the customer 580 within the evaluation room 520 is unaffected or undisturbed by the staging of the item 535-2 in the replenishment closet 550. With the internal door 552-1 in a closed position, or in a locked state, the feedback device 525-1 embedded within the internal door 552-1 is illuminated, thereby indicating that the internal door 552-1 may not be opened by the customer 580. Additionally, as is further shown in FIG. 5B, the computer system 522 may inform the customer 580 that the item 535-2 is being staged in the replenishment closet 550, e.g., by the display of information or data, or by the playing one or more sounds or other audible feedback.

As is shown in FIG. 5C, after the item 535-2 has been staged within the replenishment closet 550, the external door 552-2 in a closed position and a locked state, and the associate 540 no longer has access to the replenishment closet 550, the feedback device 525-1 is no longer illuminated. However, as is also shown in FIG. 5C, the feedback device 525-2 is illuminated about the internal door 552-1, and also on either side of the mirror 523, e.g., in a constant or flashing manner. Additionally, information or data indicating that the item 535-2 has been staged within the replenishment closet 520 is shown on the touchscreen display 524. Alternatively, or additionally, the computer system 552 may also play sounds or other audible feedback within the evaluation room 520, indicating that the item 535-2 has been staged within the replenishment closet 520.

Thus, as the customer 580 is evaluating one or more items in front of the mirror 523 or is otherwise in any orientation within the evaluation room 520, the customer 580 is likely to detect the visible feedback, and learn that the item 535-2 is accessible by way of the internal door 552-1.

Figure 5D:
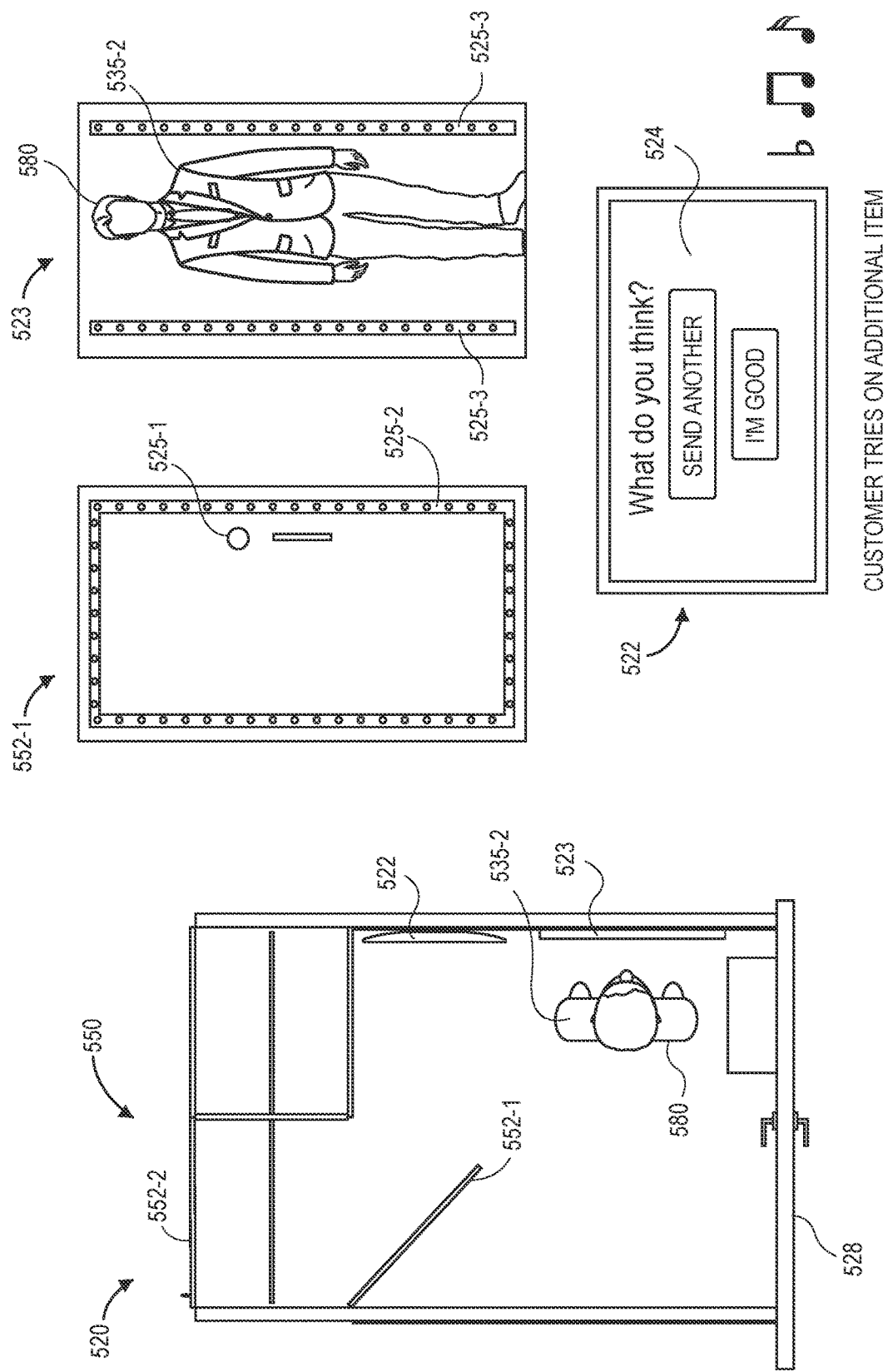

As is shown in FIG. 5D, the customer 580 retrieves the item 535-2 from the replenishment closet 550 by way of the internal door 552-1, and tries the item 535-2 on in front of the mirror 523. With the internal door 552-1 in an open position, the feedback device 525-2 and the feedback device 525-3 are no longer illuminated. Additionally, the touchscreen display 524 includes a request that the customer 580 rate the item 535-2 or request additional items by one or more gestures or other interactions therewith.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the process represented in the flow chart of FIGS. 3A and 3B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a materials handling facility comprising:
      an inventory area; and
      a fitting room comprising:
         a first computer system within the fitting room, wherein the first computer system comprises at least a first computer processor and an interactive display;
         a closet having a first door between an interior of the closet and an exterior of the fitting room and a second door between the interior of the closet and an interior of the fitting room;
         a first access control system associated with the first door; and
         a second access control system associated with the second door;
   a second computer system having at least a second computer processor and at least one data store, wherein the second computer system is associated with the materials handling facility, and wherein the second computer system is programmed with one or more sets of instructions that, when executed by the at least one computer processor, cause the second computer system to perform a method comprising:
   determining that at least a first item has been selected by or on behalf of a customer;
   instructing at least one associate of the materials handling facility to retrieve at least the first item from the inventory area and to stage at least the first item within the fitting room;
   receiving information regarding a selection of at least a second item, wherein the information regarding the selection of at least the second item is received from the customer via the first computer system;
   in response to receiving the information regarding the selection of at least the second item,
      instructing the at least one associate of the materials handling facility to retrieve at least the second item from the inventory area;
      receiving, from the at least one associate of the materials handling facility, a request to access the closet via the first door;
      in response to receiving the request,
         causing, by the second access control system, the second door to lock; and
         causing, by the first access control system, the first door to unlock;
   determining that the at least one associate has staged at least the second item within the closet; and
   in response to determining that the at least one associate has staged at least the second item within the closet,
      causing, by the first access control system, the first door to lock; and
      causing, by the second access control system, the second door to unlock.

2. The system of claim 1, wherein the fitting room further comprises:
   a first light provided on a surface of the second door visible within the interior of the fitting room when the second door is closed;
   a mirror; and
   a second light provided about at least a portion of a perimeter of the mirror, wherein the method further comprises:
   in response to receiving the request,
      causing the first light to illuminate; and
   in response to determining that the customer has staged at least the second item within the closet,
      causing the first light to darken;
      causing the second light to illuminate; and
      causing information regarding at least the second item to be displayed on the interactive display.

3. The system of claim 2, wherein the materials handling facility further comprises a shopping area,
   wherein the interior of the fitting room is defined by at least a first plurality of walls, the second door and a third door provided between the interior of the fitting room and the shopping area, and
   wherein the interior of the closet is defined by at least a second plurality of walls, the first door and the second door,
   wherein each of the first plurality of walls, the second plurality of walls, the first door, the second door and the third door is formed at least in part from one of a birch or a plywood.

4. The system of claim 1, wherein determining that at least the first item has been selected by or on behalf of the customer comprises at least one of:
   receiving information regarding a selection of the first item from a third computer system associated with the customer;
   receiving an indication that the at least one associate of the materials handling facility has selected the first item on behalf of the customer; or
   identifying the first item based at least in part on at least one attribute of the customer.

5. A method comprising:
   receiving a request to place a first door of a first closet of a first evaluation room of a materials handling facility in an open position, wherein the first door is provided between an inventory area and an interior enclosure of the first closet;
   determining that a second door of the first closet is in a closed position, wherein the second door is provided between the interior enclosure of the first closet and an interior enclosure of the first evaluation room;
   in response to determining that the second door is in the closed position,
      causing the second door to be placed in a locked state;

with the second door in the locked state,
 causing the first door to be placed in an unlocked state;
determining that at least a first item has been staged in the first closet via the first door;
determining that the first door is in a closed position; and
in response to determining that the first door is in the closed position,
 causing the first door to be placed in a locked state; and
 causing the second door to be placed in an unlocked state.

6. The method of claim 5, further comprising:
with the second door in the locked state,
 providing first feedback via at least a first feedback device provided within the interior enclosure of the first evaluation room,
wherein the first feedback indicates at least one of:
 that the second door is in the locked state; or
 that at least the first item is being staged in the first closet.

7. The method of claim 6, wherein the first feedback comprises one of:
an illumination of a light provided in a surface of the second door facing the interior enclosure of the first evaluation room; or
a display of information regarding at least one of the second door or the first item on at least one computer display provided in the first evaluation room.

8. The method of claim 6, further comprising:
with the first door in the locked state,
 providing second feedback via at least a second feedback device provided within the interior enclosure of the first evaluation room,
wherein the second feedback indicates at least one of:
 that the second door is in the unlocked state; or
 that at least the first item has been staged in the first closet.

9. The method of claim 8, further comprising:
an illumination of a light provided about at least a portion of the second door facing the interior enclosure of the first evaluation room within the interior enclosure of the first evaluation room; or
a display of information regarding at least one of the first door or the first item on the at least one computer display provided in the first evaluation room.

10. The method of claim 5, further comprising:
receiving, by at least a first access control system associated with the first door, the request to place the first door in the open position from an associate of the materials handling facility, wherein the request is received by way of at least one of:
 a keypad associated with the first access control system; or
 a mobile device of the associate in communication with the first access control system; and
authenticating the associate based at least in part on the request,
wherein that the second door is in the closed position is determined in response to authenticating the associate.

11. The method of claim 5, wherein the interior enclosure of the first evaluation room is defined by at least a plurality of walls, the second door and a third door provided between the interior enclosure of the first evaluation room and a shopping area external to the first evaluation room, and
wherein the first evaluation room further comprises a first computer device having a touchscreen display mounted to at least a first wall of the plurality of walls.

12. The method of claim 11, wherein each of the plurality of walls, at least a portion of the second door and at least a portion of the third door are formed at least in part from one of a birch or a plywood.

13. The method of claim 12, further comprising:
receiving, via the first computer device, a request for a delivery of the first item to the first evaluation room from a customer; and
in response to receiving the request for the delivery of the first item to the first evaluation room,
 causing at least the first item to be transported from an inventory area at the materials handling facility to the first door by an associate,
wherein the request to place the first door in the open position is received from the associate.

14. The method of claim 12, further comprising:
determining that the customer has selected a second item from a shopping area at the materials handling facility;
causing at least the second item to be transported from an inventory area at the materials handling facility into the first evaluation room by an associate;
determining that the second item has been transported from the inventory area into the first evaluation room; and
in response to determining that the second item has been transported from the inventory area into the first evaluation room,
 causing the third door to be placed in an unlocked state; and
 granting access to the first evaluation room to the customer via the third door.

15. The method of claim 14, further comprising:
determining at least one attribute of the customer and at least one attribute of the second item; and
identifying a third item based at least in part on the at least one attribute of the customer and the at least one attribute of the second item, wherein the third item is identified by one of a stylist or an automated system, and
wherein causing at least the second item to be transported from the inventory area at the materials handling facility into the first evaluation room by the associate comprises:
causing at least the second item and the third item to be transported from the inventory area at the materials handling facility into the first evaluation room by the associate.

16. The method of claim 14, wherein causing at least the second item to be transported from the inventory area at the materials handling facility into the first evaluation room by the associate comprises:
causing the third door to be placed in a locked state; and
with the third door in the locked state,
 causing the first door to be placed in an unlocked state; and
 causing the second door to be placed in an unlocked state,
wherein at least the second item is transported from the inventory area at the materials handling facility into the first evaluation room by the associate via the first door, the first closet and the second door.

17. A room comprising:
a computer system, wherein the computer system comprises at least a computer processor and an interactive display;
a closet, wherein the closet comprises a first door between an interior of the closet and an inventory area of a materials handling facility and a second door between the interior of the closet and an interior of the room;
a third door provided between the interior of the room and a shopping area of the materials handling facility;
a first access control system associated with the first door; and
a second access control system associated with the second door;
a third access control system associated with the third door,
wherein operation of the first access control system is interlocked with at least the second access control system,
wherein the interior of the room is defined by at least a first plurality of walls, the second door and the third door,
wherein the computer system is mounted to one of the first plurality of walls,
wherein the interior of the closet is defined by at least a second plurality of walls, the first door and the second door, and
wherein each of the first plurality of walls, the second plurality of walls, the first door, the second door and the third door is formed at least in part from one of a birch or a plywood.

18. The room of claim 17, wherein the second door further comprises a first light provided in a surface of the first door facing the interior of the room,
wherein the first light is configured to illuminate when the first door is in an open position and the second door is in a locked state.

19. The room of claim 17, wherein the second door further comprises a first light provided in a surface of the first door facing the interior of the room,
wherein the first light is configured to illuminate when the first door is in a locked state and wherein at least one item has been staged in the closet.

20. The room of claim 17, further comprising a mirror mounted to at least one of the first plurality of walls,
wherein the mirror comprises a first light provided in a surface of the mirror facing the interior of the room, and
wherein the first light is configured to illuminate when the first door is in a locked state and wherein at least one item has been staged in the closet.

* * * * *